US008864993B2

(12) United States Patent
Zhao et al.

(10) Patent No.: US 8,864,993 B2
(45) Date of Patent: *Oct. 21, 2014

(54) PROCESS FOR REMOVING AMMONIUM FROM A WASTEWATER STREAM

(75) Inventors: Hong W. Zhao, Raleigh, NC (US); Thomas Welander, Furulund (SE); Magnus Christensson, Lund (SE); Romain Lemaire, Paris (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 463 days.

This patent is subject to a terminal disclaimer.

(21) Appl. No.: 13/439,153

(22) Filed: Apr. 4, 2012

(65) Prior Publication Data

US 2013/0264280 A1    Oct. 10, 2013

(51) Int. Cl.
| | |
|---|---|
| C02F 3/30 | (2006.01) |
| C02F 3/28 | (2006.01) |
| C02F 3/12 | (2006.01) |
| C02F 3/02 | (2006.01) |
| C02F 3/34 | (2006.01) |
| C02F 11/04 | (2006.01) |

(52) U.S. Cl.
USPC ............ 210/605; 210/609; 210/612; 210/906

(58) Field of Classification Search
USPC .................. 210/605, 609, 612, 613, 615, 906
See application file for complete search history.

(56) References Cited

U.S. PATENT DOCUMENTS

| | | | |
|---|---|---|---|
| 7,575,685 B2 * | 8/2009 | Morris et al. ................. | 210/605 |
| 2002/0074287 A1 | 6/2002 | Park et al. | |
| 2005/0061737 A1 * | 3/2005 | Linden et al. ................. | 210/602 |
| 2006/0249449 A1 * | 11/2006 | Nakhla et al. ................. | 210/605 |
| 2011/0259821 A1 * | 10/2011 | Liu et al. ....................... | 210/605 |

FOREIGN PATENT DOCUMENTS

| | | |
|---|---|---|
| WO | 2011110905 A1 | 9/2011 |
| WO | 2011119982 A1 | 9/2011 |
| WO | 2011119982 A9 | 9/2011 |
| WO | 2012019310 A1 | 2/2012 |

OTHER PUBLICATIONS

Chae, K., et al., "Spatial distribution and viability of nitrifying, denitrifying and ANAMMOX bacteria in biofilms of sponge media retrieved from a full-scale biological nutrient removal plant", Bioprocess and Biosystems Engineering, Feb. 26, 2012, pp. 1157-1165, vol. 35, No. 7, Springer, Berlin, Germany, XP035097883.

(Continued)

*Primary Examiner* — Fred Prince
(74) *Attorney, Agent, or Firm* — Coats and Bennett PLLC

(57) ABSTRACT

A process that utilizes ammonium oxidizing bacteria (AOB) and anaerobic ammonium oxidizing (ANAMMOX) bacteria to remove ammonium from a wastewater stream. Sludge separated from the wastewater in a mainstream is processed in a sidestream that includes an anaerobic digester, a dewatering system, and a biofilm reactor. The anaerobic digester produces digested sludge that is dewatered, producing reject water that includes a relatively high ammonium concentration and a relatively low organic carbon concentration and a relatively high temperature. The reject water is treated in a sidestream deammonification biofilm reactor that includes biofilm carriers seeded with AOB and ANAMMOX bacteria that are effective to remove ammonium from the reject water. AOB and ANAMMOX bacteria on the media carriers is utilized to contact the wastewater in the mainstream and to remove ammonium therefrom.

37 Claims, 9 Drawing Sheets

(56) References Cited

OTHER PUBLICATIONS

Regmi, P., et al., "Nitrogen removal assessment through nitrification rates and media biofilm accumulation in an IFAS process demonstration study", Water Research, Oct. 10, 2011, pp. 6699-6708, vol. 45, No. 20, Elsevier, Amsterdam, Netherlands, XP028115531.

Christensson, M., et al., "ANITA (TM) Mox-A BioFarm Solution for Fast Start-up of Deammonifying MBBRs", Proceedings of the Water Environment Federation; WEFTEC 2011: The Water Quality Event; 84th Annual Water Environment Federation Technical Exhibition and Conference; Jan. 1, 2011; pp. 265-282, Water Environment Federation, US, XP008161267.

Yuan, Y., et al., "Research on Enrichment for Anammox Bacteria Inoculated via Enhanced Endogenous Denitrification", Life System Modeling and Intelligent Computing; Springer Berlin Heidelberg; Sep. 17, 2010; pp. 700-707; XP019151184.

Wett, B., et al., "Development of Enhanced Deammonification Selector", Proceedings of the Water Federation; WEFTEC 2010; Oct. 2, 2010, pp. 5917-5926; [Retrieved on Jun. 4, 2013], Retrieved from Internet: http://www.ingentaconnect.com; XP009170045.

* cited by examiner

DEAMMONIFICATION PROCESS WITHOUT THERMAL HYDROLYSIS

| STREAM # | STREAM NAME | FLOW MGD | NH$_4$-N mg/L | NH$_4$-N lb/d | NO$_X$-N mg/L | NO$_X$-N lb/d | BIOD. Org-N mg/L | BIOD. Org-N lb/d | NON-BIOD. Org-N mg/L | NON-BIOD. Org-N lb/d | TOTAL NITROGEN mg/L | TOTAL NITROGEN lb/d | NOTES |
|---|---|---|---|---|---|---|---|---|---|---|---|---|---|
| A | RAW SEWAGE | 1.0 | 55 | 459 | 0 | 0 | 23 | 192 | 2 | 17 | 80 | 667 | Typical High Strength Municipal Sewage |
| B | PRIMARY SLUDGE | 0.01 | | | | | 1,200 | 100 | | | | | 15% of TN removal by Primary Clarifier |
| C | PRIMARY EFFLUENT | 1.0 | 55 | 459 | 0 | 0 | 11 | 92 | 2 | 17 | 68 | 567 | |
| D | THICKENED SECONDARY SLUDGE | 0.005 | | | | | 2,950 | 123 | | | 2,950 | 123 | N assimilation = 6% of BOD by BOD removal only system; Primary effluent BOD = 245 mg/L |
| E | SECONDARY EFFLUENT | 1.0 | 51 | 427 | 0 | 0 | 0 | 0 | 2 | 17 | 53 | 444 | All biod. Org-N is converted to ammonia after secondary biological treatment |
| F | COMBINED SLUDGE | 0.015 | | | | | 1,783 | 223 | | | 1783 | 223 | Prim sludge + secondary sludge |
| G | ANAEROBIC DIGESTED SLUDGE | 0.015 | 895 | 112 | 0 | 0 | 888 | 111 | | | 1783 | 233 | Without THP, 50% of org-N in the sludge is released as ammonia, 50% org-N remains in sludge. |
| H | SLUDGE CAKE | | | | | | | 105 | | | | 105 | Without THP, 95% of org-N in the digested ends up in sludge cake. Cake flow rate is negligible |
| I | REJECT WATER FROM DEWATERING | 0.02 | 671 | 112 | 0 | 0 | 0 | 0 | 36 | 6 | 707 | 118 | 0.005 MGD wash water is added during dewatering. 5% of org-N in the digested sludge is soluble and not biodegradable |
| J | SIDESTREAM DEAMMON. EFFLUENT | 0.02 | 100 | 16.8 | 57 | 9.5 | 0 | 0 | 36 | 6 | 192 | 32 | About 85% removal for ammonia and 75% for TN removal and 10% nitrate is produced during anammox process. |
| K | MAINSTREAM DEAMMON. INFLUENT | 1.0 | 53 | 444 | 1.1 | 9.5 | 0 | 0 | 2.8 | 23 | 57 | 476 | Combined Streams = secondary effluent + sidestream effluent |
| L | MAINSTREAM DEAMMON. EFFLUENT | 1.0 | 10 | 83 | 5.5 | 36+ 9.5 | 0 | 0 | 2.8 | 23 | 18.0 | 152 | Effluent ammonia at 10 mg/L is expected for mainstream deammon. 10% of nitrate is produced during the anammox process. |
| M | FINAL EFFLUENT | 1.0 | 1.0 | 8.3 | 1.0 | 8.3 | 0 | 0 | 2.8 | 23 | 4.8 | 40 | 1 mg/L ammonia & 1 mg/L nitrate of final effluent can be achieved with conventional BNR processes |

*FIG. 7*

DEAMMONIFICATION PROCESS WITH THERMAL HYDROLYSIS

| STREAM # | STREAM NAME | FLOW MGD | NH4-N mg/L | NH4-N lb/d | NOx-N mg/L | NOx-N lb/d | BIOD. Org-N mg/L | BIOD. Org-N lb/d | NON-BIOD. Org-N mg/L | NON-BIOD. Org-N lb/d | TOTAL NITROGEN mg/L | TOTAL NITROGEN lb/d | NOTES |
|---|---|---|---|---|---|---|---|---|---|---|---|---|---|
| A | RAW SEWAGE | 1.0 | 55 | 459 | 0 | 0 | 23 | 192 | 2 | 17 | 80 | 667 | Typical High Strength Municipal Sewage |
| B | PRIMARY SLUDGE | 0.01 | | | | | 1,200 | 100 | | | | | 15% of TN removal by Primary Clarifier |
| C | PRIMARY EFFLUENT | 1.0 | 55 | 459 | 0 | 0 | 11 | 92 | 2 | 17 | 68 | 567 | |
| D | THICKENED SECONDARY SLUDGE | 0.005 | | | | | 2,950 | 123 | | | 2,950 | 123 | N assimilation = 6% of BOD by BOD removal only system; Primary effluent  BOD = 245 mg/L |
| E | SECONDARY EFFLUENT | 1.0 | 51 | 427 | 0 | 0 | 0 | 0 | 2 | 17 | 53 | 444 | All biod. Org-N is converted to ammonia after secondary biological treatment |
| F | COMBINED SLUDGE | 0.015 | | | | | 1,783 | 223 | | | 1783 | 223 | Prim sludge + secondary sludge |
| G | ANAEROBIC DIGESTED SLUDGE | 0.015 | 1,335 | 167 | 0 | 0 | 448 | 56 | | | 1783 | 223 | Without THP, 75% of org-N in the sludge is released as ammonia, 25% org-N remains in sludge. |
| H | SLUDGE CAKE | | | | | | | 39 | | | | 39 | With THP, 70% of org-N in the digested ends up in sludge cake. Cake flow rate is negligible. |
| I | REJECT WATER FROM DEWATERING | 0.02 | 1,001 | 167 | 0 | 0 | 0 | 0 | 102 | 17 | 1,103 | 184 | 0.005 MGD wash water is added during dewatering, 30% of org-N in the digested sludge is soluble and not biodegradable |
| J | SIDESTREAM DEAMMON. EFFLUENT | 0.02 | 150 | 25 | 84 | 14 | 0 | 0 | 102 | 17 | 335 | 56 | About 85% removal for ammonia and 75% for TN removal and 10% nitrate is produced during anammox process. |
| K | MAINSTREAM DEAMMON. INFLUENT | 1.0 | 54 | 452 | 1.7 | 14 | 0 | 0 | 4.0 | 34 | 60 | 500 | Combined Streams = secondary effluent + sidestream effluent |
| L | MAINSTREAM DEAMMON. EFFLUENT | 1.0 | 10 | 83 | 6.0 | 14+37 | 0 | 0 | 4.0 | 34 | 20 | 168 | Effluent ammonia at 10 mg/L is expected for mainstream deammon. 10% of nitrate is produced during the anammox process. |
| M | FINAL EFFLUENT | 1.0 | 1.0 | 8.3 | 1.0 | 8.3 | 0 | 0 | 4.0 | 34 | 6.0 | 50.6 | 1 mg/L ammonia & 1 mg/L nitrate of final effluent can be achieved with conventional BNR processes |

FIG. 8

PROCESS FOR REMOVING AMMONIUM FROM A WASTEWATER STREAM

FIELD OF THE INVENTION

The present invention relates to a system and process for removing ammonium from a wastewater stream, and more particularly to a deammonification process that entails the use of aerobic ammonium oxidizing (AOB) bacteria and anaerobic ammonium oxidizing (ANAMMOX) bacteria.

BACKGROUND OF THE INVENTION

Typically, wastewater influent includes ammonium nitrogen, $NH_4$—N. Conventionally, to remove ammonium nitrogen, a two step process is called for, nitrification and denitrification. In this conventional approach to removing ammonium nitrogen, the process entails a first step which is referred to as a nitrification step and which entails converting the ammonium nitrogen to nitrate and a very small amount of nitrite, both commonly referred to as $NO_x$. Many conventional activated sludge wastewater treatment processes accomplish nitrification in an aerobic treatment zone. In the aerobic treatment zone, the wastewater containing the ammonium nitrogen is subjected to aeration and this gives rise to a microorganism culture that effectively converts the ammonium nitrogen to $NO_x$. Once the ammonium nitrogen has been converted to $NO_x$, then the $NO_x$-containing wastewater is typically transferred to an anoxic zone for the purpose of denitrification. In the denitrification treatment zone, the $NO_x$-containing wastewater is held in a basin where there is no supplied air and this is conventionally referred to as an anoxic treatment zone. Here a different culture of microorganisms operate to use the $NO_x$ as an oxidation agent and thereby reduces the $NO_x$ to free nitrogen which escapes to the atmosphere. For a more detailed understanding and appreciation of conventional biological nitrification and denitrification one is referred to the disclosures found in U.S. Pat. Nos. 3,964,998; 4,056,465; 5,650,069; 5,137,636; and 4,874,519.

Conventional nitrification and denitrification processes have a number of drawbacks. First, conventional nitrification and denitrification processes require substantial energy in the form of oxygen generation that is required during the nitrification phase. Further, conventional nitrification and denitrification require a substantial supply of external carbon source.

In recent years, it has been discovered that deammonification can be carried out in limited circumstances in a single stage biofilm reactor. This process utilizes biofilm carriers and is designed to grow certain types of bacteria on the biofilm carriers. In particular, the targeted bacteria is aerobic ammonium oxidizing (AOB) bacteria and anaerobic ammonium oxidizing (ANAMMOX) bacteria. To a substantial extent, this approach to deammonification has been limited to sidestream applications where there is a relatively high concentration of ammonium, a relatively low concentration of organic carbon and a relatively high temperature. This process is used, for example, in treating reject water from anaerobically digested sludge. The term "reject water" means an aqueous stream that is contained within a sidestream of a wastewater treatment process and where the aqueous stream includes a relatively high ammonium concentration relative to wastewater in the mainstream.

There are many advantages to a deammonification process. Approximately 60% less oxygen is required for the removal of a certain amount of ammonium nitrogen. In addition, a deammonification process does not require an additional carbon source. Furthermore, a deammonification process results in less $CO_2$ production and less sludge production.

Therefore, there is a need for a deammonification process that is suitable to substantially remove ammonium in both the mainstream and sidestream of a wastewater treatment process and which does not require the substantial amount of oxygen required for conventional nitrification and denitrification, and which is particularly suitable for mainstream wastewater streams that have a relatively high organic carbon content and a relatively low ammonium concentration.

SUMMARY OF THE INVENTION

The present invention relates to a deammonification process that utilizes AOB and ANAMMOX bacteria to remove ammonium from both the mainstream and one or more sidestreams of a wastewater treatment process.

Further, the present invention entails growing AOB and ANAMMOX bacteria in a sidestream where the wastewater therein has a relatively high ammonium concentration, and utilizing the AOB and ANAMMOX bacteria grown in the sidestream to remove ammonium from the wastewater in the mainstream.

Also, the present invention entails alternating contact of the AOB and ANAMMOX bacteria with wastewater in the mainstream and sidestream wherein the sidestream contact is utilized to both remove ammonium from the wastewater in the sidestream and to rejuvenate the AOB and ANAMMOX bacteria under favorable operating conditions of temperature and substrate level such that when it is returned to the mainstream it will be effective to remove ammonium from the wastewater in the mainstream.

In one embodiment, a wastewater treatment process includes a mainstream and a sidestream and the process includes removing ammonium from the wastewater in the sidestream as well as removing ammonium from the wastewater in the mainstream. In this embodiment, the wastewater in the mainstream includes a relatively low ammonium concentration and the wastewater in the sidestream includes a relatively high ammonium concentration. In the sidestream, the wastewater having the relatively high ammonium concentration is directed to a sidestream biofilm reactor having biofilm carriers therein. In the sidestream biofilm reactor, conditions are favorable for growing ANAMMOX bacteria on the biofilm carriers. This is due in part at least to the relatively high ammonium concentration in the wastewater in the sidestream. The ANAMMOX bacteria on the biofilm carriers in the sidestream biofilm reactor assists in reducing the ammonium concentration of the wastewater in the sidestream. The ANAMMOX bacteria on the biofilm carriers is also utilized to reduce the ammonium concentration of the wastewater in the mainstream which, compared to the wastewater in the sidestream, includes a relatively low ammonium concentration. This is accomplished by contacting the wastewater in the mainstream with the ANAMMOX bacteria on the biofilm carriers after the ANAMMOX bacteria has resided in the sidestream biofilm reactor. The process continues by alternating contact of the ANAMMOX bacteria on the biofilm carriers with the wastewater in the mainstream and with the wastewater in the sidestream such the ANAMMOX bacteria, when contacting the wastewater in the mainstream, assists in reducing the ammonium concentration of the wastewater in the mainstream and when in contact with the wastewater in the sidestream, the ANAMMOX bacteria assists in reducing the concentration of the ammonium in the wastewater in the sidestream. The exposure of the biomass to the wastewater in the sidestream having the relatively high ammonium concentration is effective to rejuvenate the ANAMMOX bacteria such that when the ANAMMOX bacteria is brought back into contact with the wastewater in the mainstream, the ANAMMOX bacteria is effective to reduce the ammonium concentration of the wastewater in the mainstream.

Other objects and advantages of the present invention will become apparent and obvious from a study of the following description and the accompanying drawings which are merely illustrative of such invention.

BRIEF DESCRIPTION OF THE DRAWINGS

FIG. 7 is a table showing ammonium nitrogen removal at certain points in the processes of FIGS. 1 and 2 without thermal hydrolysis.

FIG. 8 is a table showing ammonium nitrogen removal at certain points in the processes of FIGS. 1 and 2 with thermal hydrolysis.

DESCRIPTION OF EXEMPLARY EMBODIMENTS OF THE INVENTION

Figure 1:
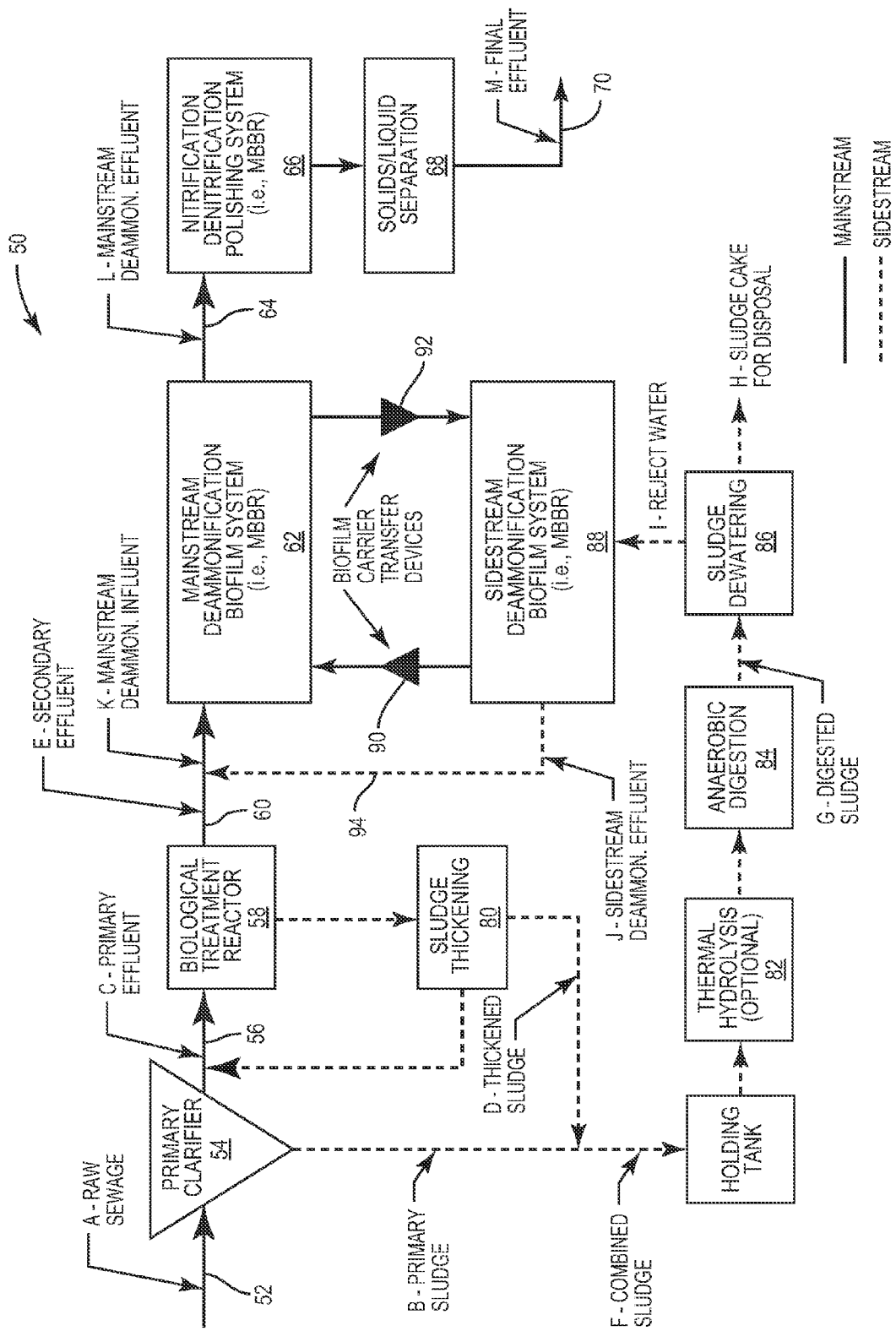
FIG. 1 is a schematic illustration of a deammonification process including both sidestream and mainstream processes.

The present invention relates to a process for removing ammonium-nitrogen, $NH_4$—N, where ammonium nitrogen is oxidized to nitrite-nitrogen without producing substantial nitrate-nitrogen and then the nitrite-nitrogen is denitrified to produce elemental nitrogen. This basic process is performed both in the sidestream and mainstream of a wastewater treatment system and process. As described below, certain bacteria capable of carrying out this form of ammonium-nitrogen removal is grown in the sidestream and used to remove ammonium nitrogen in the sidestream. Conditions in the sidestream that are conducive to growing bacteria capable of performing this process is maintained in the sidestream. From time-to-time this bacteria is brought into contact with the wastewater in the mainstream and the bacteria functions to remove ammonium nitrogen from the wastewater in the mainstream according to this process. However, the conditions in the mainstream are not conducive for growing the bacteria that is effective in carrying out this particular process for removing ammonium nitrogen. Thus, from time to time the bacteria is required to be brought into contact with the wastewater in the sidestream so as to rejuvenate the bacteria such that when the bacteria is brought back into contact with the wastewater in the mainstream, the bacteria will effectively remove the ammonium nitrogen.

More particularly, the deammonification process of the present invention entails partial nitrification to nitrite (i.e., nitritation) combined with what has become known as the anaerobic ammonium oxidation process to achieve autotropic nitrogen removal within a single stage biofilm reactor, such as a moving bed biofilm reactor (MBBR). The two steps of the process in a single stage biofilm reactor are assumed to take place in different layers of a biofilm. The nitritation is carried out by aerobic ammonium oxidizing bacteria (AOB) and takes place in the outer layer of the biofilm while anaerobic ammonium oxidation (ANAMMOX) bacteria occurs in the inner layer of the biofilm. Thus, it is hypothesized that in such a single stage biofilm reactor, there is simultaneous ammonium nitrogen removal by the AOB and ANAMMOX bacteria. Compared to conventional nitrification and denitrification, this deammonification approach can achieve nitrogen removal from wastewater with approximately 60% less oxygen and no requirement for an external carbon source. Thus this process contributes significantly toward energy neutral in wastewater treatment.

There are challenges to making such a deammonification process work effectively. One of the main challenges is that in this approach to deammonification the ANAMMOX bacteria grows slowly and there is a relatively small biomass yield of the ANAMMOX bacteria. In addition, the ANAMMOX bacteria is sensitive to low dissolved oxygen concentrations, high nitrite concentrations, and other environmental factors such as temperature due to its autotropic and anaerobic nature.

Thus, as discussed above, the present invention focuses on growing and proliferating the ANAMMOX bacteria on biofilm carriers in the sidestream where conditions such as a relatively high concentration of ammonium, a relatively high temperature and a relatively low concentration of organic carbon is conducive to the growth of the ANAMMOX bacteria. Once the ANAMMOX bacteria in the sidestream has reached a certain concentration or maturity, then it can be brought into contact with the wastewater in the mainstream where the ANAMMOX bacteria, along with the AOB bacteria, will be effective to remove ammonium nitrogen from the mainstream by transferring the biofilm carriers. Again, the conditions in the mainstream are not generally sufficient to grow and cause the ANAMMOX bacteria to proliferate. This is because as a general rule the conditions in the mainstream will be such that there is a relatively low ammonium concentration, a relatively low temperature and sometimes a relatively high organic carbon concentration. Because of this, after some time in the mainstream, the biofilm carriers with the ANAMMOX and AOB biofilm will be brought back into contact with the reject water in the sidestream where conditions exist that cause the ANAMMOX bacteria to grow and proliferate.

Deammonification processes can be utilized for ammonium removal from reject water produced by dewatering anaerobic digested sludge. This process is customarily carried out in a sidestream process. Such sidestream processes typically utilize a biofilm reactor system, such as MBBRs or granular systems. Due to the favorable conditions and characteristics of the reject water, such as a relatively high temperature, a relatively high ammonium concentration and a relatively low organic carbon concentration, AOB and ANAMMOX bacteria in the sidestream deammonification process are capable of growing at a reasonably high rate and outcompeting heterotrops. By utilizing the biofilm carriers, the sidestream process is effective to produce seeded biofilm carriers which can be transferred or routed to other biofilm deammonification processes as seeds.

The nitrogen load in the reject water typically represents about 15-20% of the total plant nitrogen load in a conventional nitrification-activated sludge plant and the remaining 80-85% load still requires treatment in the mainstream using conventional nitrification and denitrification processes. Therefore, the application of a deammonification process in the mainstream is useful in achieving nitrogen removal and meeting energy neutral goals or requirements within a wastewater treatment plant. Thus the concept of the present invention is to utilize a deammonification process that removes a substantial portion, at least approximately 70-80%, of the ammonium nitrogen load entering the wastewater treatment system 50. See FIGS. 1-5. The concept is to achieve this by utilizing both sidestream and mainstream deammonification processes. The term "mainstream treatment" means a wastewater treatment system or process that treats the liquid from the raw sewage to the final effluent and which usually includes primary clarifiers and secondary biological treatment system with or without biological nutrient removal (BNR). The term "sidestream treatment" or "sidestream process" means a process that is carried out in areas outside of the mainstream and generally constitutes the flows generated within a wastewater treatment system in addition to the plant influent. For example, a sidestream process may include supernatants, backwash waters, rinse waters and other types of liquid streams that are produced in the operation of a wastewater treatment process.

Raw sewage or primary effluent is generally not suitable for a deammonification process because such wastewaters are generally high in organic carbon or high in the ratio of carbon to nitrogen. Therefore, in applying a mainstream deammonification process, the system and process is configured to remove nitrogen from the secondary effluent. In one embodiment, the biological process used to treat the primary effluent focuses mainly on biochemical oxygen demand (BOD) removal. Such a BOD removal system can be: (1) a suspended growth system such as a short solid retention time (SRT) conventional activated sludge (CAS) system or a high purity oxygen activated sludge system; (2) a biofilm system such as a carbon removal MBBR and carbon removal biological aerated filter (BAF); or (3) an anaerobic treatment system such as an upflow anaerobic sludge blanket (UASB) system or an anaerobic membrane bioreactor (AnMBR). The effluent from the above systems is referred to as secondary effluent and this secondary effluent typically contains a relatively low ammonium concentration and a relatively low BOD and a relatively low total suspended solids (TSS) concentration.

Even with low BOD and TSS, the secondary effluent is still not readily suitable for a deammonification process due to its relatively low temperature and relatively low ammonium concentration. As used herein, when it is said that the wastewater in the mainstream includes a relatively low temperature and a relatively low ammonium concentration, this is compared to the reject water in the sidestream because, as pointed out herein, the reject water in the sidestream compared to the wastewater in the mainstream includes a relatively high temperature and a relatively high ammonium concentration as well as a relatively low organic carbon to nitrogen ratio. In some cases there may be a reference to a relatively low carbon concentration. This means a relatively low carbon to nitrogen ratio. A relatively low temperature in the mainstream results in a relatively low intrinsic growth rate of the ANAMMOX bacteria. The low ammonium concentration in the mainstream can be a substrate limiting factor for the growth of ANAMMOX bacteria especially in biofilm treatment systems. The above two factors lead to a relatively slow biomass production. Even where biofilm carriers are used to retain and support the biomass, it is still difficult to build up enough biomass that is needed to perform an effective deammonification treatment process within a reasonable reactor volume in the mainstream.

Therefore, the present invention envisions bioaugmenting a mainstream deammonification process from its sidestream counterpart. In other words, the present invention entails generating seeded biofilm carriers or supports in the sidestream where the biofilm carriers or supports are seeded with AOB and ANAMMOX bacteria and strategically using the seeded biofilm carriers or supports to remove ammonium nitrogen from the wastewater in the mainstream and particularly removing ammonium nitrogen from the secondary effluent.

Figure 2:
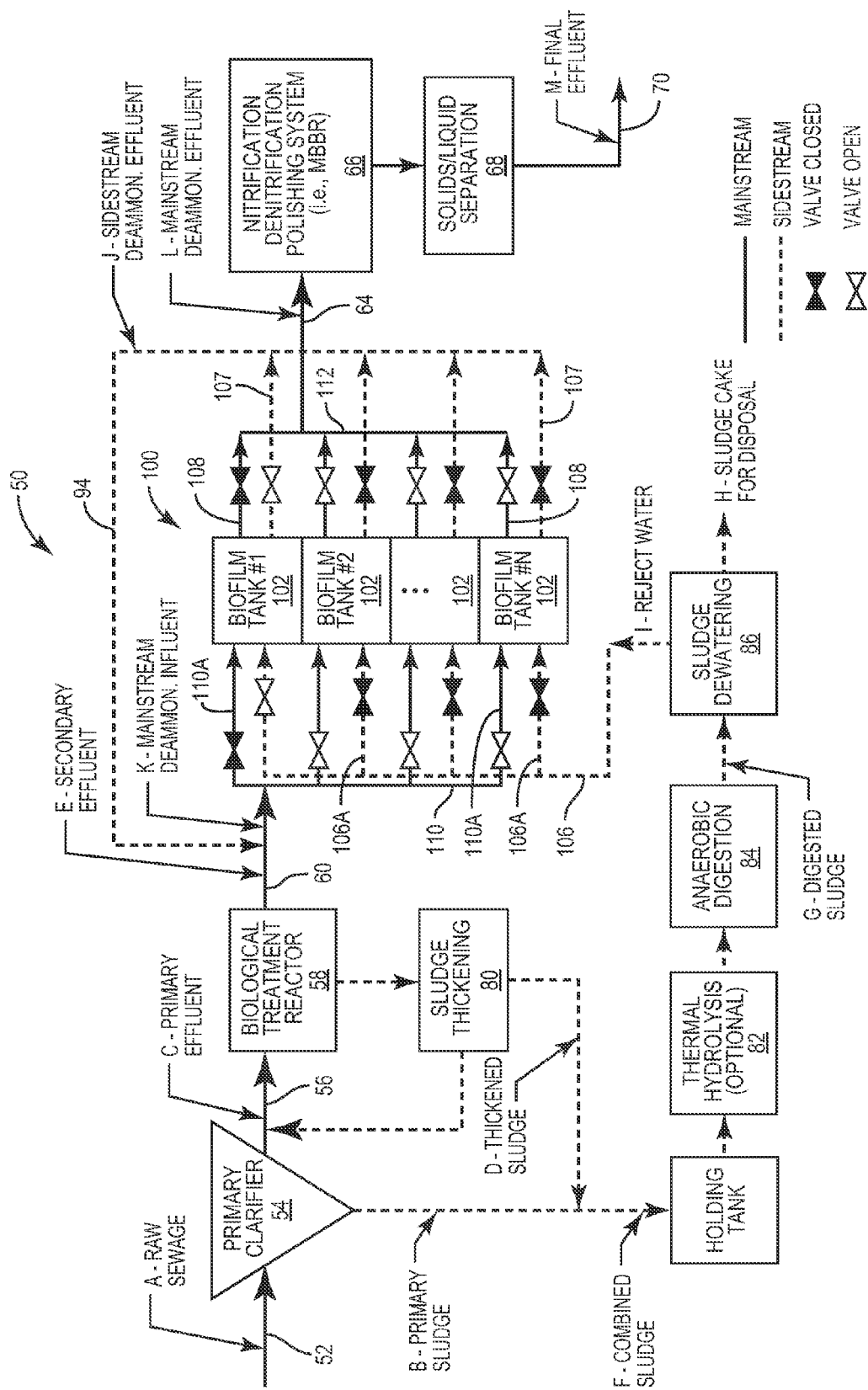
FIG. 2 is a schematic illustration showing an alternative mainstream and sidestream process for removing ammonium from wastewater.
Figure 3:
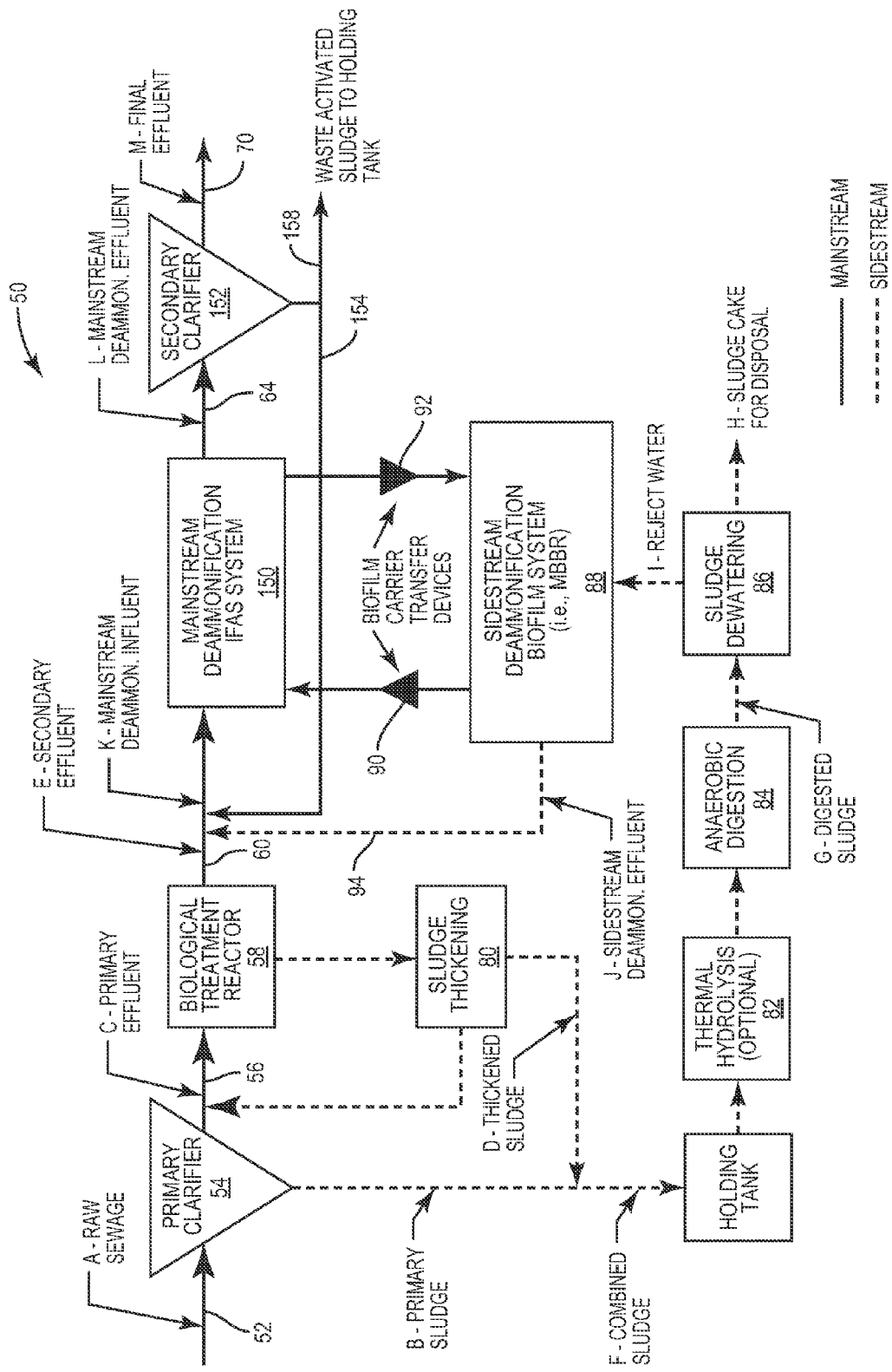
FIG. 3 is a schematic illustration of a deammonification process similar to that depicted in FIG. 1 but in this case involving an integrated fixed film activated sludge system.

FIGS. 1-3 disclose three systems and processes for accomplishing both sidestream and mainstream deammonification. In FIG. 1, the seeded biofilm carriers are transferred back and forth between a sidestream deammonification biofilm reactor 88 and a mainstream deammonification biofilm reactor 62. In the FIG. 2 embodiment, there is provided alternating feed between the secondary effluent and the reject water to an integrated mainstream—sidestream deammonification system 100. In this particular embodiment, the AOB and ANAMMOX bacteria are mainly produced when the biofilm carriers are feeding on the reject water in the sidestream in the deammonification reactor 102 and this effectively removes ammonium nitrogen or ammonium from the reject water and at the same time serves to seed the biofilm carriers for future use in removing ammonium nitrogen from the secondary effluent in the mainstream. The FIG. 3 embodiment is similar to the system and process shown in FIG. 1 but utilizes an integrated fixed film activated sludge process.

With particular reference to the drawings, a wastewater treatment system is shown therein and indicated generally by the numeral 50. As alluded to before, wastewater treatment system 50 is designed to remove ammonium nitrogen or ammonium from the wastewater by utilizing AOB and ANAMMOX bacteria. Wastewater treatment system 50 is disclosed in two embodiments, the embodiment of FIG. 1 and the embodiment of FIG. 2. However, both embodiments employ mainstream and sidestream biofilm processes. The AOB and ANAMMOX bacteria are grown in the sidestream and utilized to remove ammonium in the sidestream and are also brought into contact with wastewater in the mainstream to remove ammonium therefrom. From time-to-time the bacteria and biofilm carriers utilized are brought back into contact with the sidestream in order to rejuvenate the bacteria and to continue removal of ammonium from the sidestream.

Viewing FIG. 1, the mainstream includes a primary clarifier 54 followed by a biological treatment reactor 58. As discussed above, various biological systems can be used for BOD removal in the biological treatment reactor 58. For example, typical BOD removal systems include short solid retention time conventional activated sludge systems or high purity oxygen activated sludge systems, biofilm systems such as a carbon removal MBBR system and carbon removal biological aerated filter (BAF) or an anaerobic treatment system such as the UASB or AnMBR systems. Downstream of the biological treatment reactor 58 is a mainstream deammonification biofilm reactor 62. Downstream from reactor 62 is an optimal conventional nitrification—denitrification polishing system 66 and a solids-liquid separator 68. In some cases, the present process may reduce ammonium concentration in the mainstream deammonification process without having to employ a nitrification—denitrification polishing process. In this embodiment, these components form the mainstream components. However, it is appreciated that the wastewater treatment system 50 may include additional components that might address specific contaminants or process conditions. In addition, the mainstream includes influent line 52 that is directed into the primary clarifier 54. A primary effluent line 56 is operatively connected between the primary clarifier 54 and the biological treatment reactor 58. A secondary effluent line 60 is operatively connected between the biological reactor 58 and the mainstream deammonification reactor 62. Finally, there is an effluent line 64 connected between the reactor 62 and the nitrification—denitrification polishing system 66 in systems or processes that might employ a nitrification—denitrification polishing system. Finally, there is an effluent line 70 that extends from the solids-liquid separator 68.

In the sidestream there is provided a sludge thickener 80. Sludge thickener 80 receives secondary sludge from the biological treatment reactor 58. Sludge effluent lines extend from the primary clarifier 54 and the sludge thickener 80 to a thermal hydrolysis unit 82 which is optional. In some cases, the combined sludge from the primary clarifier 54 and the sludge thickener 80 is directly sent to an anaerobic digester 84. Downstream of the anaerobic digester 84 is a sludge dewatering unit 86 that produces a sludge cake for disposal and reject water. Reject water from the sludge dewatering unit 86 is directed to a sidestream deammonification biofilm system 88. Both the mainstream and sidestream deammonification biofilm systems 62 and 88 employ biofilm carriers. Both systems 62 and 88 include an aeration system and mixers or other conventional means of mixing. In the embodiment illustrated in FIG. 1, there is provided biofilm transfer devices 90 and 92. This is to permit the transfer of biofilm carriers with the biomass supported thereon back and forth between the mainstream deammonification biofilm system 62 and the sidestream deammonification biofilm system 88. Various types of biofilm transfer devices can be employed. In one example, the biofilm carrier transfer device comprises an airlift pump that pumps water upwardly from the systems or reactors 62 or 88 and in the course of pumping the water, biofilm carriers and the biomass thereon is entrained in the water. At an elevated point, the biofilm carriers are effectively separated from the water and pass by gravity, for example, from reactor 88 to reactor 62 or vice versa. The biofilm carrier transfer devices are designed such that when the biofilm carriers are separated from the water, that the water drains back into the underlying reactor 62 or 88.

Turning to FIG. 2, the wastewater system shown therein includes the mainstream—sidestream integrated deammonification system indicated generally by the numeral 100. System 100, compared to the FIG. 1 embodiment, is utilized in lieu of reactors 62 and 88. Effectively the integrated mainstream—sidestream deammonification system 100 is designed to function as a part of the mainstream and sidestream of the wastewater treatment system 50. Viewing system 100 in more detail, it is seen that the same includes a series of biofilm tanks or biofilm reactors 102. The number of tanks or reactors can vary depending on the required capacity of the wastewater treatment system and the ammonium nitrogen load of the wastewater influent. Each of the biofilm reactors 102 is provided with aerators and mixers or other conventional means for mixing the wastewater therein.

Viewing FIG. 2 and the integrated system 100 in more detail, it is seen that there is provided a main reject water line 106 that extends from the sludge dewatering unit 86 to the integrated system 100. Branching off from the main reject water line 106 is a series of feed lines 106A with each feed line being directed into one of the biofilm reactors 102. Each feed line 106A includes a flow distribution device such as a valve for controlling the flow of reject water into the various biofilm reactors 102. In addition, there is provided a mainstream feed line 110 that is operatively connected to the secondary effluent line 60. Branching off of the mainstream feed line 110 is a series of mainstream feed branches 110A that are operative to direct secondary effluent into the respective biofilm reactors 102. Each of these feed branches 110A includes a control valve. On the outlet side of each biofilm reactor 102 there is provided two outlet lines 107 and 108 for conveying treated reject water or treated secondary effluent from the respective biofilm reactors. Each of these outlet lines also include a valve for controlling the flow of treated reject water or secondary effluent therethrough. Outlet lines 107, in one embodiment, are utilized to convey treated reject water from the biofilm tanks 102. Outlet lines 108, on the other hand and in the case of one embodiment, are utilized to convey a treated secondary effluent from the respective biofilm tanks 102. Outlet lines 108 are operatively connected to a manifold line 112 that directs the treated secondary effluent into line 64. Outlet lines 107, in one embodiment, are operatively connected to the recycle line 94. That allows treated reject water to be recycled to a point upstream of the mainstream/sidestream integrated deammonification system 100. The design shown in FIG. 2 is utilized when there is a high water quality requirement for the water passing through line 64. In some cases when the water quality requirement is not as high, lines 107 and 108 associated with each biofilm tank 102 can be combined to form a single line that is operatively connected to the manifold 112. In this latter case, it follows that the treated reject water is not recycled via line 94.

FIG. 3 depicts an alternative embodiment of the present invention that is similar in many respects to the process of FIG. 1. The basic difference in the two processes is that the process of FIG. 3 utilizes an integrated fixed film activated sludge (IFAS) system in the mainstream deammonification process. That is, the deammonification reactor 150 shown in FIG. 3 includes fixed film biomass and suspended biomass. Again, the fixed film biomass comprises biomass supported on a biofilm carrier or other support structure. This process also includes a secondary clarifier 152 located downstream from the deammonification reactor 150. A return activated sludge line 154 extends from the clarifier 152 to the secondary effluent line 60. The deammonification reactor 150 is typically provided with aerators and mixers.

Turning now to the process shown in FIG. 1, it is seen that the primary clarifier 54 produces primary sludge and the biological treatment reactor 58 produces secondary sludge. The secondary sludge is directed to the sludge thickener 80 and the produced thickened sludge is combined with the primary sludge and in one case is directed to the thermal hydrolysis unit 82. As noted above, the thermal hydrolysis unit 82 is optional. In any event, the output of the thermal hydrolysis unit 82 or the combined sludge is directed to the anaerobic digester 84 that produces digested sludge. Digested sludge is directed to the sludge dewatering system 86 which produces sludge cake for disposal and the reject water. Reject water includes a relatively high temperature, a temperature that is usually greater than 20° C. and is typically in the range of 25° C. to 35° C. Further, the reject water has a relatively high ammonium nitrogen concentration. Without thermal hydrolysis, the ammonium concentration of the reject water is approximately 300-1500 mg/L. Typically the ammonium nitrogen concentration is approximately 1000 mg/L. However, with thermal hydrolysis, the ammonium nitrogen concentration of the reject water is approximately 1000-2000 mg/L and typically approximately 1500 mg/L.

In any event, the reject water is directed into the sidestream deammonification biofilm system or reactor 88. Reactor 88 includes biofilm carriers and the biofilm carriers are seeded with AOBs and ANAMMOX bacteria which results from the favorable conditions that exist in reactor 88. Biofilm or biomass supported by the biofilm carriers is effective in reactor 88 to remove ammonium nitrogen from the reject water. As seen in exemplary table of FIG. 7, the ammonium nitrogen concentration of the reject water is 671 mg/L while the treated effluent from reactor 88, the sidestream deammonification effluent, is 100 mg/L. As the table suggests, this constitutes approximately 85% removal for ammonium, 75% removal for total nitrogen (TN) and approximately 10% nitrate is produced in the sidestream reactor 88. As seen in FIG. 1, the treated reject stream is directed through line 94 and mixed with the secondary effluent.

While removing ammonium nitrogen from the reject water in reactor 88, the AOB and ANAMMOX bacteria grow and proliferate. As a general rule, the doubling time is approximately 1-2 days for AOB bacteria and greater than 10-11 days for ANAMMOX bacteria.

To achieve deammonification in the mainstream, once the biofilm carriers in the sidestream reactor 88 are adequately seeded with AOB and ANAMMOX bacteria, then some of the biofilm carriers can be transferred from the sidestream reactor 88 to the mainstream deammonification reactor 62. As noted above, this can be achieved by utilizing an air lift pump to lift the biofilm carriers from the reject water in reactor 88 and by utilizing a gravity slide, conveyor or other means for transferring seeded biofilm carriers directly into the mainstream deammonification reactor 62. Here the biofilm consisting of the AOB and ANAMMOX bacteria is effective to remove ammonium nitrogen from the secondary effluent. As the table of FIG. 7 shows, in an exemplary embodiment, the ammonium nitrogen is reduced in the mainstream reactor 62 from 53 mg/L to 10 mg/L. As the accompanying note indicates in the table of FIG. 7, the effluent ammonium is expected to be approximately 10 mg/L and 10% of the nitrate is produced via the deammonification process in the mainstream reactor 62.

As discussed above, the conditions in the mainstream deammonification reactor 62 are not conducive to grow the AOB and ANAMMOX bacteria. This is because the secondary effluent includes a relatively low ammonium concentration and typically includes a relatively low temperature, typically approximately 8-10° C. Therefore, after a certain amount of time, the biofilm carriers are transferred back to the sidestream reactor 88 for rejuvenation. Various ways can be utilized to transfer the biofilm carriers. Again, an air lift pump coupled with a gravity slide or other conveying devices can be used. The concept here is to transfer the biofilm carriers back to the sidestream reactor 88 where the biofilm is exposed to favorable conditions for growing and causing the AOB and ANAMMOX bacteria to grow and proliferate.

It is hypothesized that the process just described and disclosed in FIG. 1 will remove approximately 80% of the ammonium nitrogen from the wastewater. This may not meet final effluent requirements for the removal of ammonium or BOD and TSS. Therefore, the system and process envisions in some cases utilizing a conventional nitrification and denitrification polishing system denoted by the numeral 66 in FIG. 1. In addition, suspended solids can be removed in the solids-liquids separation system 68 to provide a final effluent that will meet effluent requirements for TSS.

As seen in the process in FIG. 3, the mainstream deammonification biofilm system is coupled with a secondary clarifier 152 and there is a return activated sludge (RAS) line 154 that leads from the clarifier back to a point in the mainstream, upstream of the mainstream deammonification IFAS system 150. This allows suspended biomass to build up in the biofilm systems. Such biofilm systems become an integrated fixed film activated sludge system (IFAS). The additional suspended biomass provided increases the process loading rates and contributes to meeting more stringent effluent requirements.

By employing dissolved oxygen control and sludge retention time control, the additional suspended biomass provided in the IFAS deammonification process performs nitritation. This leaves the biofilm biomass (ANAMMOX Bacteria) to perform the anaerobic ammonium oxidation process. Compared to the biofilm only system with the two layer biofilm structure (outside AOB layer and inside ANAMMOX bacteria layer), the IFAS deammonification system with suspended growth (for AOB) and one layer biofilm (for ANAMMOX bacteria) will significantly reduce the mass transfer resistance into the sludge flocs and into the biofilm layer. Thus the IFAS deammonification biofilm system significantly increases the deammonification rates (for example, as much as 2 to 3 times), thus reducing reactor volume. Because nitritation in the system will be performed by suspended growth AOB, the system can achieve much lower effluent ammonium concentration compared to a biofilm only configuration due to a less mass transport limitation of ammonium. With improved effluent quality and the secondary clarifiers, the IFAS system can meet final effluent requirements, thus eliminating the needs for additional polishing steps used in biofilm only configurations. Because of thinner biofilm and nitritation occurring in suspended biomass in the IFAS system, a lower dissolved oxygen concentration can be maintained. A lower dissolved oxygen concentration, for example, of 0.2-1.0 mg/L compared to 0.5-2.0 mg/L in biofilm only configurations, indicates a significant energy saving in the IFAS system.

In one embodiment, when employing an IFAS system in both mainstreams and sidestreams, the operating conditions are:

dissolved oxygen of approximately 0.2 to approximately 2.0. mg/L;

MLSS of approximately 0.5 to approximately 6.0 g/L;

Suspended growth SRT=2 to 20 days depending on wastewater temperature

Effluent NH4-N of approximately 1 to approximately 100 mg/N/L;

Effleunt $NO_3$—N in inlet of approximately 2% to approximately 20% of N removed.

Figure 4:
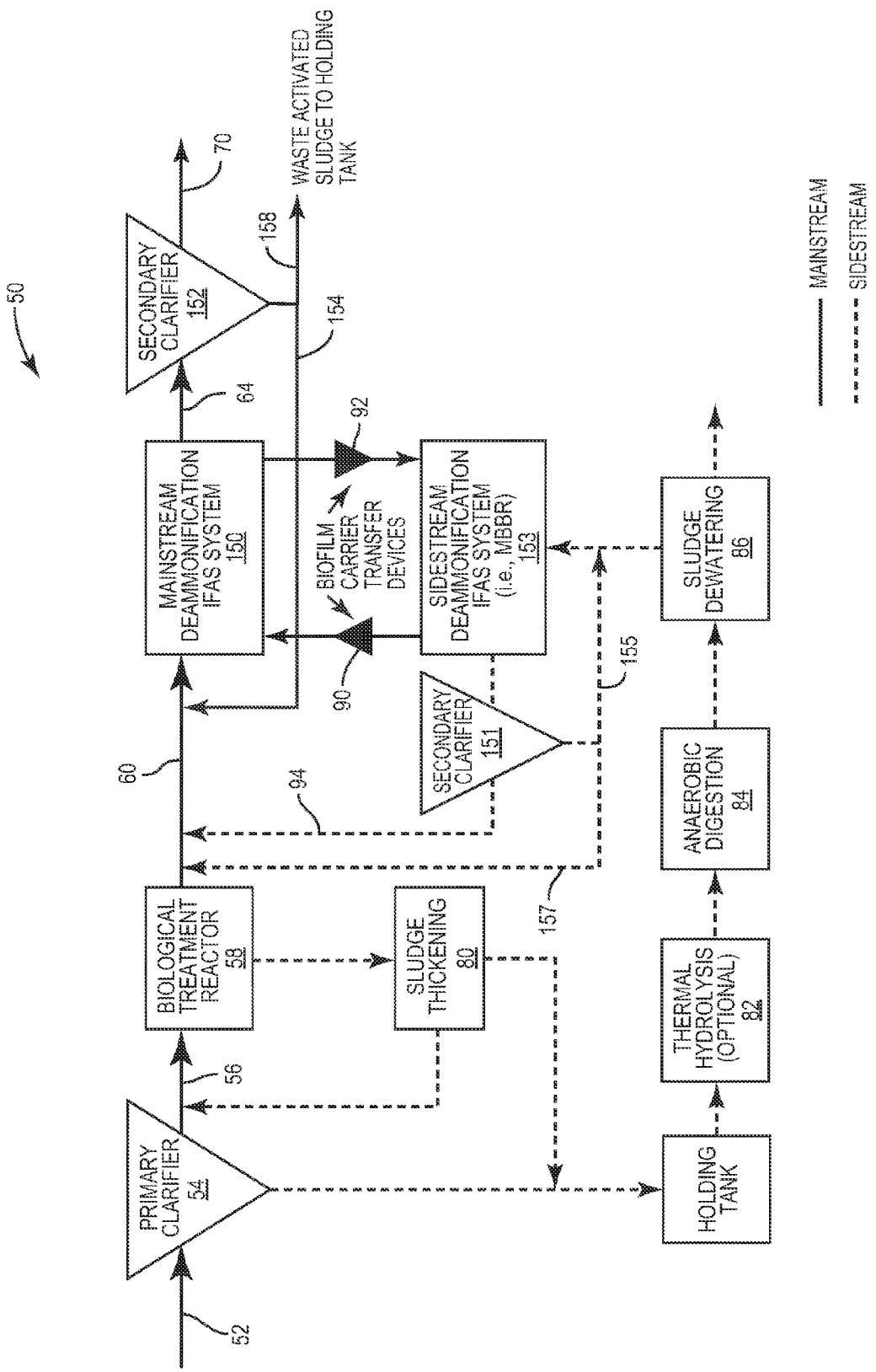
FIG. 4 illustrates a deammonification process that employs both a mainstream and sidestream integrated fixed film activated sludge system for removing ammonium.

FIG. 4 shows an IFAS deammonification process that entails both a mainstream and sidestream IFAS deammonification process. In both the mainstream and sidestream there is fixed film biomass and suspended biomass. Note that the mainstream deammonification IFAS system 150 shown in FIG. 4 is essentially the same as discussed above with respect to FIG. 3. However, in the FIG. 4 process, the sidestream deammonification system is also an IFAS system. Note that treated reject water in the sidestream deammonification IFAS system 153 is directed to a secondary clarifier 151. Treated effluent 94 from the secondary clarifier 151 is directed to the mainstream and into line 60, upstream of the mainstream deammonification IFAS system 150. Sludge produced by the secondary clarifier 151 can be recycled via line 155 or can be directed to the mainstream and into line 60 via 157, again upstream from the mainstream deammonification IFAS system. The return activated sludge line 155 is to build up the suspended biomass in the sidestream IFAS system 153. Line 157 is the waste activated sludge line for the sidestream IFAS system 153 and will be used to control the SRT in the sidestream and to provide suspended biomass (for example AOB) to the mainstream counterpart.

In the case of the process depicted in FIG. 4, the biofilm carriers are transferred back and forth via transfer devices 90 and 92 between the sidestream deammonification IFAS system 153 and the mainstream deammonification IFAS system 150. As discussed before, the fixed film biomass and the suspended biomass will perform different functions in removing ammonium from the reject water and from the secondary effluent. Nitritation in the systems will be performed by suspended growth AOB while the anaerobic ammonium oxidation will be carried out the ANAMMOX bacteria on the biofilm. By transferring the biofilm carriers back and forth between systems 150 and 153, the fixed film biomass when in the sidestream reactor 153 is subjected to favorable conditions for growing the ANAMMOX bacteria. By transferring biofilm carriers from the sidestream reactor 153 to the mainstream reactor 150, the fixed film biomass in the mainstream reactor 150 includes an effective amount of ANAMMOX bacteria to carry out the same process in the mainstream.

In the process depicted in FIG. 4, significant amount of suspended biomass mainly AOB is produced in the sidestream IFAS system 153. The suspended biomass is transferred to the mainstream IFAS system 150 via waste line 157. The transferred suspended biomass (AOB) will act as seed and performs nitritation in the mainstream IFAS deammonification system. This will reduce the minimum SRT required to accomplish the targeted nitritation in the mainstream, thus reducing the tank volume in the mainstream IFAS system.

Figure 9:
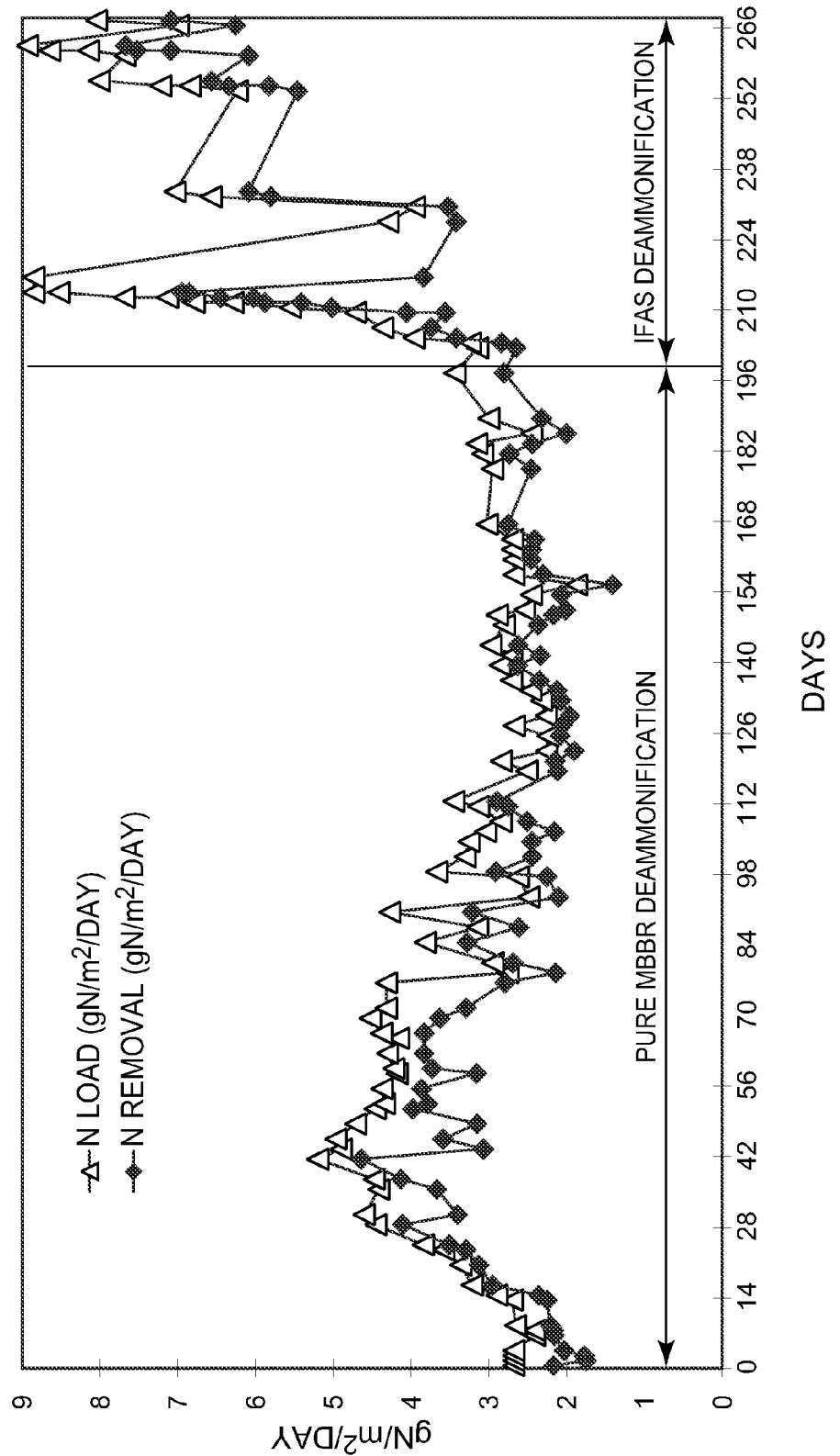
FIG. 9 is a graph which shows laboratory results that compares deammonification processes performed by a biofilm only system and an integrated fixed film activated sludge system.

Reference is made to FIG. 9 which shows laboratory results for comparing deammonification processes performed by biofilm only (MBBR) and IFAS systems. Note the right hand side of the graph shows nitrogen removal for an IFAS deammonification process that was started shortly after day 196 of the test. Prior to instituting the IFAS deammonification process, the system was operated as MBBR deammonification process. Both cases reflect nitrogen removal in a sidestream. As can be seen from the graph of FIG. 8, the IFAS deammonification process was substantially more efficient in removing nitrogen from the wastewater with nitrogen removal rate up to 2-3 times higher than the biofilm only deammonification processes.

Turning to the FIG. 2 process, instead of the sidestream reactor 88 and the mainstream reactor 62, the FIG. 2 process utilizes the integrated mainstream—sidestream system 100. As discussed above, the system 100 includes a multiplicity of biofilm tanks or reactors 102. Each tank is provided with an aeration system in order to perform aerobic treatment and there is also provided in each tank a mixer or at least conventional means to mix the wastewater or reject water therein. Tanks 102 are biofilm reactors and hence each tank includes an appropriate mass or array of biofilm carriers. The term "biofilm carriers" as used herein means any structure for supporting the biomass and includes plastic media.

In the FIG. 2 process, reject water is directed from the sludge dewatering system 86 to the reject feed line 106. In this case only one biofilm reactor 102 receives the reject water. Note that the valve in the upper feedline to biofilm tank #1 is open. Thus the reject water, high in ammonium concentration and of a relatively high temperature is directed into biofilm tank #1. This will facilitate the growth and proliferation of the AOB and ANAMMOX bacteria. At the same time the AOB and ANAMMOX bacteria that form a biofilm on the biofilm carriers are effective to reduce the ammonium nitrogen concentration of the reject water in biofilm tank #1. Effluent from biofilm tank #1 is directed out an outlet line through an open valve to recycle line 94. Optionally, the treated reject water from biofilm tank #1 is recycled back to the mainstream and to a point upstream of the integrated system 100.

While the reject water is being directed into biofilm tank #1, the remaining biofilm tanks are being utilized to remove ammonium nitrogen from the secondary effluent. This of course presumes that the remaining biofilm tanks have been previously seeded with biofilm carriers rich in AOB and ANAMMOX bacteria. Because the volume of secondary effluent is greater than the volume of the reject water, it follows that more reactor volume is generally required to treat the secondary effluent than to treat the reject water. Therefore, in this example, one biofilm tank is utilized to treat the reject water and three biofilm tanks are utilized to treat the secondary effluent. The number of tanks utilized for each treatment and the respective volumes required may vary and depend on the flow rate of raw sewage into the system 50 and the ammonium nitrogen load accompanying the wastewater.

The concept with the FIG. 2 process is to utilize the mainstream—sidestream integrated system 100 as both a sidestream process and a mainstream process. The one or more biofilm tanks handling the reject water will effectively form a part of the sidestream. The one or more biofilm tanks handling the secondary effluent will form a part of the mainstream process.

In one exemplary embodiment, the reject water from the sludge dewatering unit 86 will be sequentially directed to each of the biofilm tanks 102. Again, the function achieved is that the biofilm carriers and the biomass thereon will remove ammonium nitrogen from the reject water and at the same time the conditions presented by the reject water will cause the AOB and ANAMMOX bacteria to grow and proliferate such that they can be used in a succeeding process for removing ammonium nitrogen from the secondary effluent. Therefore it follows that during one period of time, in this example, one biofilm tank is receiving reject water and the remaining biofilm tanks are receiving secondary effluent. Then in a succeeding phase or during a second time period, the reject water is directed to another biofilm tank while at least a portion of the secondary effluent is now directed into the biofilm tank formerly receiving the reject water. This enables the reject water to continuously rejuvenate the biofilm such that the biofilm is capable of effectively removing ammonium nitrogen from the secondary effluent.

Figure 5:
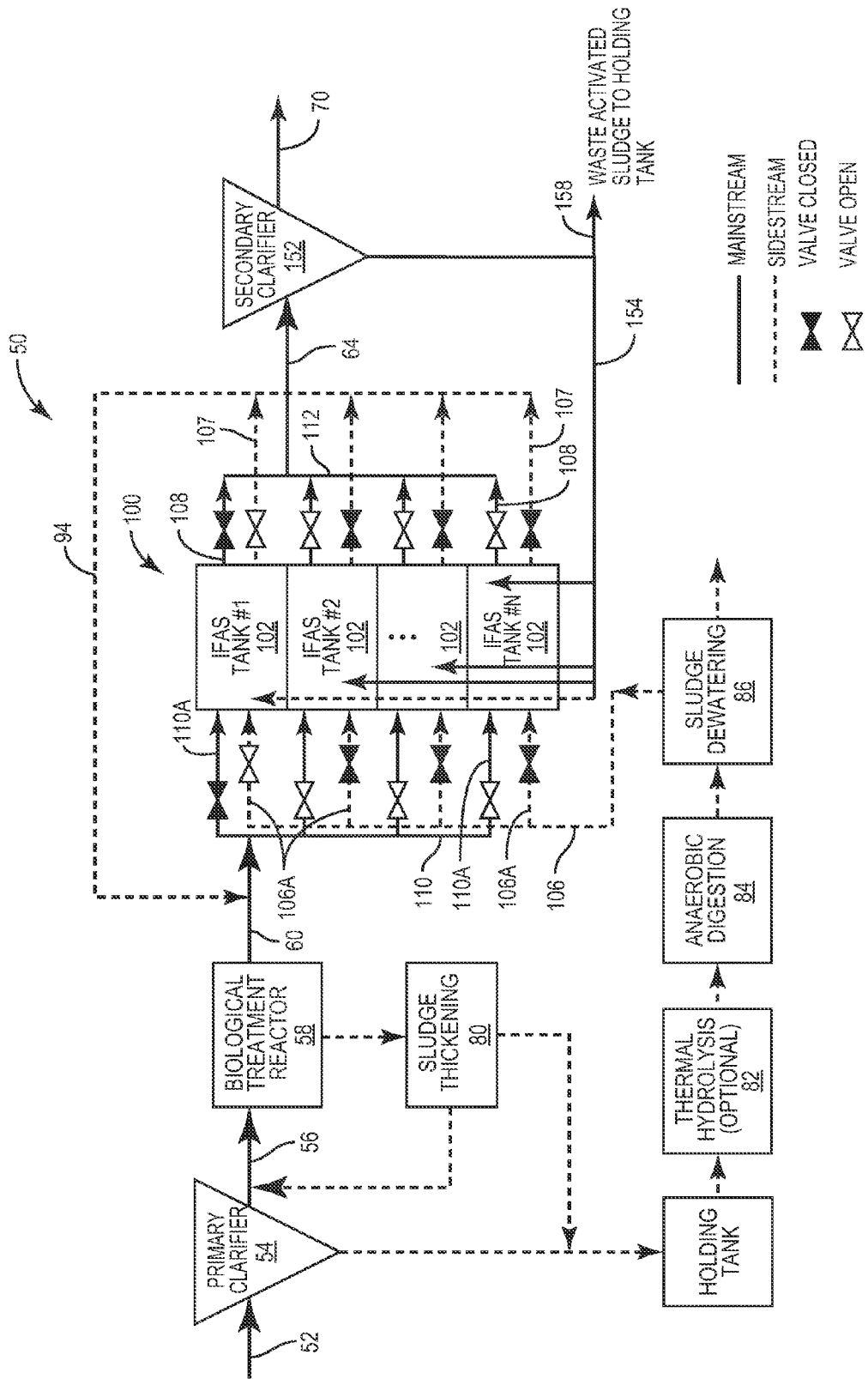
FIG. 5 is a schematic illustration showing a particular mainstream and sidestream deammonification process employing integrated fixed film activated sludge systems for removing ammonium.

FIG. 5 illustrates another deammonification process that is designed to remove ammonium in both the mainstream and the sidestream. The system and process shown in FIG. 5 entails an integrated IFAS system that functions to remove ammonium in both the sidestream and mainstream. The system and process shown in FIG. 5 is similar in some respects to the system and process shown in FIG. 2. The system and process shown in FIG. 2 is a fixed film process where the biomass is supported by carriers or some other support structure. The system and process shown in FIG. 5 not only utilizes fixed film biomass in each of the IFAS tanks 102 but also utilizes suspended biomass, thereby giving rise to an integrated fixed film activated sludge process.

Note in FIG. 5 where the effluent in line 64 is directed to a secondary clarifier 152. Secondary clarifier 152 produces a mainstream final effluent in line 70. Further, the secondary clarifier 152 settles out activated sludge which is transferred back to the IFAS tanks 102 via line 154. Line 154 that carries return activated sludge splits into a number of branches such that return activated sludge can be directed to each of the IFAS tanks 102. On the sludge return line 154, there is provided a waste activated sludge line 158 to remove extra sludge produced in the IFAS system, thus controlling its SRT as well.

Each IFAS tank 102 is provided with an aeration system in order to perform aerobic treatment and there is also provided in each tank a mixer or at least conventional means to mix the activated sludge and fixed film biomass with the reject water or secondary effluent. It should be noted that there are cases wherein dedicated secondary clarifiers 152 in FIG. 5 are not required. In this case, the IFAS deammonification multiple tank system 100 shown in FIG. 5 is a sequencing batch reactor (SBR).

In the FIG. 5 process, reject water from the sludge dewatering unit 86 is directed through line 106 to the reject inlet lines 106A. In the case illustrated in FIG. 5, only the upper IFAS tank 102 receives the reject water. Note that the valve in the upper inlet line 106A is open. Thus the reject water, high in ammonium concentration and of a relatively high temperature, is directed into the upper IFAS tank (tank #1). This will facilitate 1) the growth and proliferation of the ANAMMOX bacteria supported on the carriers or other biofilm support in IFAS tank #1 and 2) the growth and proliferation of the AOB in the suspended growth in IFAS tank #1. At the same time, the suspended AOB and the ANAMMOX bacteria on the biofilm carriers are effective to reduce the ammonium nitrogen concentration of the reject water in the IFAS tank #1. In one embodiment, effluent from the IFAS tank #1 is directed through an outlet line 107 and through an open valve to recycle line 94. Optionally, the treated reject water from IFAS tank #1 is recycled back to a point upstream of the integrated IFAS system 100.

While the reject water is being directed to IFAS tank #1, the remaining IFAS tanks, in one embodiment, are utilized to remove ammonium nitrogen from the secondary effluent. This, of course, presumes that the remaining IFAS tanks 102 have been previously seeded with biofilm carriers rich in ANAMMOX bacteria. Because the volume of the secondary effluent is greater than the volume of the reject water, it follows that more reactor volume is required to treat the secondary effluent than to treat the reject water. Therefore, in this example, one IFAS tank is utilized to treat the reject water and three IFAS tanks are used to treat the secondary effluent. The number of tanks utilized for each treatment and the respective volume required may vary and depend on the flow rate of raw sewage into the system 50 and the ammonium nitrogen load accompanying the wastewater.

As discussed before with respect to an IFAS system, the additional suspended biomass provided in an IFAS deammonification process will perform nitritation. This leaves the biofilm biomass supported on the carriers or other support structure to perform the anaerobic ammonium oxidation process by utilizing ANAMMOX bacteria. As discussed above, the IFAS deammonification system, such as disclosed in FIG. 5, may significantly increase the deammonification rate. It is hypothesized that this increase may be as much as two to three times or even more where the IFAS deammonification system is applied in both the mainstream and the sidestream.

Figure 6:
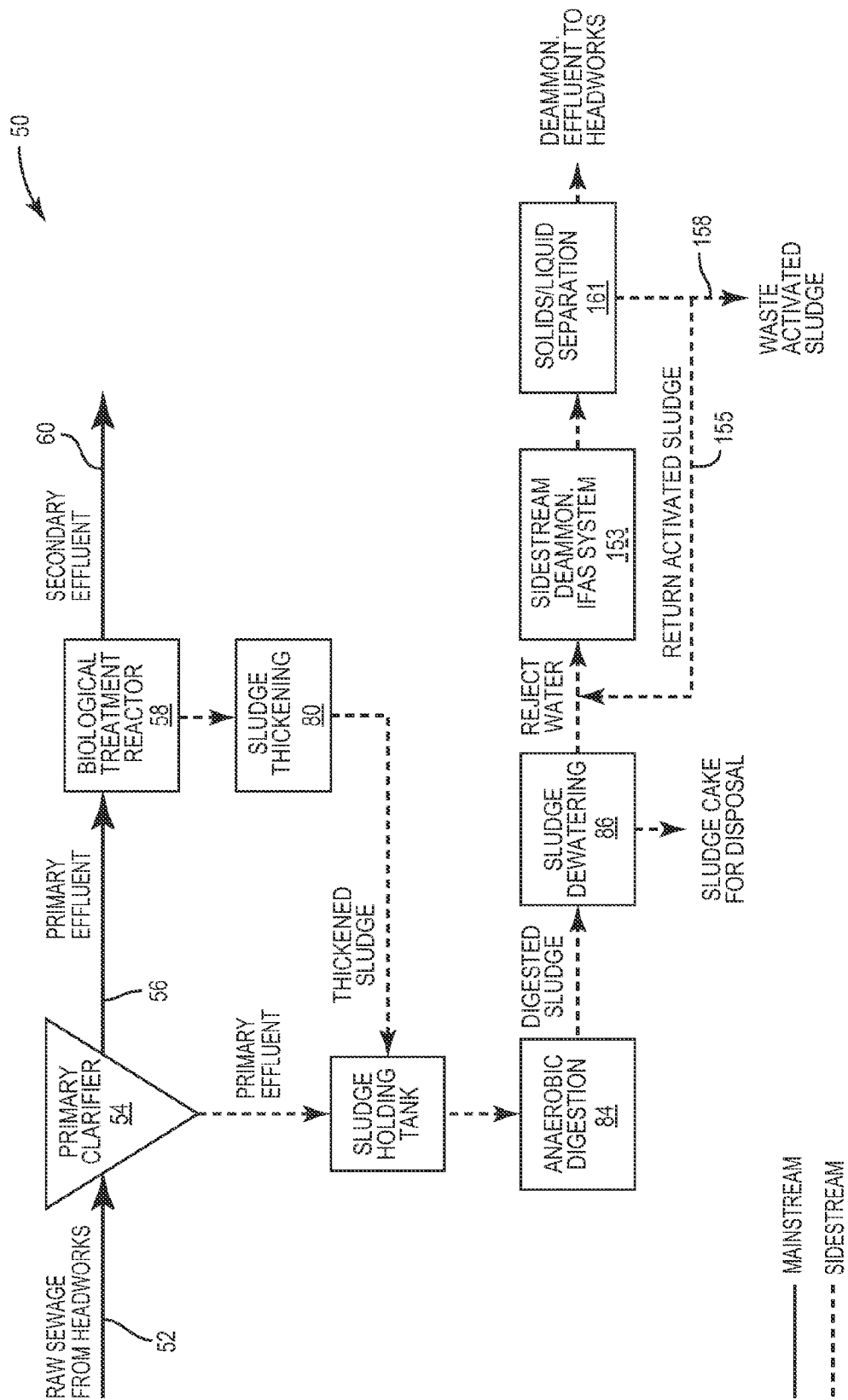
FIG. 6 illustrates a deammonification process employing integrated fixed film activated sludge system for removing ammonium in side streams.

Turning to FIG. 6, there is shown therein a wastewater treatment process that includes both mainstream and sidestream processes. As will be discussed, the sidestream includes a deammonification integrated fixed film activated sludge system for removing ammonium from reject water in the sidestream. Referring to FIG. 6, raw sewage is directed to a primary clarifier 54 in the mainstream. Primary clarifier 54 produces a primary effluent and a primary sludge. The primary sludge is directed to the sidestream while the primary effluent is directed to one or more reactors 58 that perform secondary treatment of the wastewater with or without biological nutrient (nitrogen and phosphorus) removal. The secondary treatment produces a secondary effluent as well as sludge. Sludge produced in the secondary reactor or reactors 58 is directed to a sludge thickening unit 80 in the sidestream.

Thickened sludge from the sludge thickening unit 80 and primary sludge from the primary clarifier 54 are directed to a sludge holding tank in the sidestream. Sludge from the sludge holding tank, in one embodiment, is directed to an anaerobic digester 84 that produces digested sludge. The digested sludge is directed to a sludge dewatering unit 86 that dewaters the sludge to produce reject water and sludge cake for disposal. The reject water, as discussed above, includes a relatively high ammonium concentration and a relatively high temperature compared to the wastewater in the mainstream. In any event, the reject water is directed to the sidestream deammonification IFAS system 153. As discussed above, the reactor or reactors that constitute the deammonification IFAS system are provided with aerators and at least some means to mix the contents of the reactor or reactors. Furthermore, because the system 153 is an IFAS system, this means that there is suspended biomass as well as fixed film biomass in the reactors that constitute the system 153. As discussed above, the suspended biomass in treating the reject water performs nitritation which results in converting $NH_4$ to nitrite ($NO_2^-$). The nitritation process removes a substantial portion of the ammonium in the reject water. Biofilm carriers in the sidestream deammonification system 153 include ANAMMOX bacteria growing and supported thereon. The ANAMMOX bacteria are effective to convert a substantial portion of the remaining $NH_4$ and nitrite to elemental nitrogen. Thus the suspended biomass (AOB) and the ANAMMOX bacteria cooperate to carry out a deammonification process in the sidestream.

Downstream from the sidestream deammonification IFAS system 153 is a solids separator 151 which, in this case, depicts a conventional clarifier. The biofilm carriers are retained in the IFAS system 153 while the effluent directed to the clarifier 151 includes suspended biomass that is separated from an effluent that is directed from the clarifier 151. The sludge as settled by the clarifier 151 includes suspended biomass that is returned to the sidestream deammonification IFAS system 153 by return activated sludge line 155. Some sludge settled by the clarifier 151 is wasted via line 158.

As discussed above, the solids retention time of the suspended biomass in this IFAS system can be controlled by the amount of waste activated sludge. By employing SRT control and dissolved oxygen control in the IFAS system, the suspended biomass in the IFAS deammonification process just described is effective to perform nitritation. As alluded to before, compared to the biofilm only deammonification system with the two layer biofilm structure (outside layer for growing AOB and inside layer for growing the ANAMMOX bacteria), the IFAS deammonification system with suspended growth and one layer biofilm will significantly reduce the mass transfer resistance into the sludge flocs and into the biofilm layer. Thus the IFAS deammonification biofilm system will significantly increase the deammonification rates in the sidestream, in this example, and hence will reduce reactor volume. Because of the one layer biofilm and nitritation occurring in the suspended biomass, a lower dissolved oxygen concentration can be maintained in an IFAS system such as depicted in FIG. 6.

The IFAS configuration shown in FIG. 6 can include a single sidestream deammonification IFAS reactor that would contain and hold both the suspended biomass and biofilm carriers having the ANAMMOX bacteria supported thereon. In the FIG. 6 design, the solids separator 151 is shown external to the IFAS reactor 153. However, the solids separator, such as a clarifier or membrane module, could be embedded in the IFAS reactor 153. It should be noted that there are cases wherein a dedicated solids separator in the IFAS 153 may not be required. In those cases, the IFAS deammonification system 153 shown in FIG. 6 is a sequencing batch reactor (SBR).

The operating conditions for the sidestream IFAS deammonification process can vary. However, in one exemplary embodiment, the dissolved oxygen level in the IFAS reactor 153 can be maintained in the range of 0.2-1.5 $mgO_2/L$. The mixed liquor suspended solids (MLSS) could be maintained in the range of 0.5-4.0 g/L. The operating SRT could be between 2-15 days depending on the reject water temperature. The effluent from the sidestream IFAS system 153 would typically include an $NH_4$—N concentration in the effluent of approximately 5 to approximately 100 mgN/L. The $NO_3$—N concentration in the effluent would typically be in the range of approximately 5 to approximately 20% of the nitrogen removed.

FIGS. 3-6 illustrate various process embodiments that utilize IFAS systems to remove ammonium. The IFAS configuration, as discussed above, entails a biofilm reactor (e.g., MBBR) with/without dedicated solids separation devices to retain suspended biomass (e.g., clarifiers with return sludge). The IFAS deammonification systems shown in FIG. 3-6 could be designed as sequencing batch reactors (SBR), thus, dedicated solids separation devices are not required.

IFAS configurations achieve deammonification in a single reactor tank by using suspended biomass to achieve a majority of the nitritation and biofilm biomass to carry out most of the anaerobic ammonium oxidation process. It should be pointed out that an IFAS configuration can be used with or without external sludge separation devices. For example, separation devices (such as clarifiers and membrane modules) can be contained or embedded in the biofilm reactor. In certain cases, in an IFAS configuration, the suspended biomass can be transferred between the sidestream and the mainstream. One example of this is shown in FIG. 4. Suspended biomass settled in the secondary clarifier 151 can be transferred to the mainstream via line 157. In other cases, the same suspended biomass can be exposed to both the reject water in the sidestream and to the secondary effluent in the mainstream. This occurs in the IFAS configuration shown in FIG. 5. This is because in one mode one or more of the IFAS tanks 102 will function as a part of the sidestream process and one or more of the other IFAS tanks 102 will function as a part of the mainstream process. Thus, in one mode suspended biomass and fixed film biomass in one of the IFAS tanks will contact the reject water and in another mode the same biomass will contact the secondary effluent.

Because the characteristics of the secondary effluent are different from those of the reject water, the operating conditions for the mainstream IFAS deammonification processes depicted in FIGS. 3 thru 5 are different from those of the IFAS sidestream deammonification process. In one exemplary embodiment, the dissolved oxygen level in the IFAS reactor 150 can be maintained in the range of 0.2-2.0 $mgO_2/L$. The mixed liquor suspended solids (MLSS) could be maintained in the range of 0.5-6.0 g/L. The operating SRT could be between 5-20 days depending on the secondary effluent temperature. The effluent from the mainstream IFAS system 150 would typically include an $NH_4$—N concentration in the effluent of approximately 1 to approximately 10 mgN/L. The $NO_3$—N concentration in the effluent would typically be in the range of approximately 2% to approximately 20% of the nitrogen removed. Achieving a lower effluent ammonia concentration to meet the final effluent requirements without polishing step is one of the major advantages of the mainstream IFAS system compared to the mainstream biofilm-only systems.

One of the challenges in operating a mainstream deammonification process is to suppress the suspended growth of nitrite oxidizing bacteria (NOB) (the microorganisms that converts nitrite to nitrate and compete with the ANAMMOX bacteria for nitrite) even with dissolved oxygen and sludge retention time (SRT) controls. Alternating the feed to the biomass between the reject water and the secondary effluent or periodically contacting the biomass with the reject water can serve as a means to suppress the NOB growth because the high ammonium concentration in the reject water is an inhibitor to NOB growth.

In the FIGS. 1 thru 5 processes, the mainstream deammonification system follows a separate carbon removal system and in a preferred embodiment removal is limited to carbon or focuses primarily on carbon removal. Compared to conventional activated sludge systems with nitrification, BOD removal only systems (i.e., systems designed to be substantially limited to removal of BOD) produce more sludge and thus transfer more nitrogen to the anaerobic digester which will end up in the sidestream deammonification process. Therefore, the sidestream deammonification in both configuration (FIGS. 1 and 2) treats about 20-25% of the total nitrogen load to the plant. The mainstream deammonification treats about 75-80% of the total nitrogen. A BOD removal only system can shift about 5% of the nitrogen load to the sidestream from the mainstream due to excess sludge production, which is sent to the anaerobic digester. The table in FIG. 7 presents the expected performance by the two process configurations shown in FIGS. 1 and 2 in treating 1 MGD having a typical high strength municipal sludge. Only anaerobic digestion, without thermal hydrolysis, is considered in the table of FIG. 7.

In all the sidestream configurations, thermal hydrolysis is an optional step and can be included with anaerobic sludge digestion to increase the nitrogen level in the sidestream. Thermal hydrolysis combined with anaerobic digestion will typically increase volatile solids reduction by 50% compared to anaerobic digestion alone. It is expected that the ammonium release from the anaerobic digestion will increase by 50% due to thermal hydrolysis. Therefore, thermal hydrolysis will increase the nitrogen load to the sidestream up to 35% of the total plant load and leave 65% to the mainstream. The table in FIG. 8 presents the expected performance by the two process configurations in FIG. 1 and FIG. 2 in treating 1 MGD of typical high strength municipal sewage with thermal hydrolysis added to the anaerobic digestion.

Incorporation of a BOD removal only system and thermal hydrolysis process into the two configurations shown in FIGS. 1 thru 5 will increase the nitrogen load to the sidestream. The more nitrogen load to the sidestream, the more biomass is produced in the sidestream and more seeded biofilm carriers are available in the mainstream counterpart. A comparison between the tables in FIGS. 7 and 8 indicates that the ratio of the nitrogen removal of the sidestream to that of the mainstream is increased from about 0.26 to 0.38 by incorporating the thermal hydrolysis process into the anaerobic sludge digestion process. The expected performance in both tables indicates that the majority of the total nitrogen load (about 80%) is removed by the main and sidestream deammonification processes and the remaining 20% of the nitrogen load is removed by the conventional nitrification—denitrification polishing process.

There are many advantages to the deammonification process described above. Approximately 60% less oxygen is required for the removal of a certain amount of ammonium nitrogen. In addition, this particular process does not require an additional carbon source. In addition, the process results in less $CO_2$ production and less sludge production.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of biologically treating wastewater in a wastewater treatment system to remove carbon and ammonium from the wastewater, the method comprising:
   A. treating the wastewater in a mainstream including:
      1. separating primary sludge from the wastewater and producing a primary effluent having a relatively low ammonium concentration and a relatively low temperature;
      2. directing the primary effluent to at least one mainstream reactor;
      3. biologically treating the wastewater in the mainstream reactor to remove carbon from the wastewater and producing a secondary effluent and secondary sludge;
   B treating the primary sludge and secondary sludge in a sidestream including:
      1. directing the sludge to a sidestream anaerobic digester and treating the sludge in the anaerobic digester to produce digested sludge;
      2. directing the digested sludge to a sidestream dewatering system and dewatering the digested sludge to produce reject water having a relatively high ammonium concentration and relatively high temperature;
      3. directing the reject water to a sidestream deammonification biofilm reactor having biofilm carriers therein and growing a biomass on the biofilm carriers for simultaneously nitrifying and denitrifying ammonium;
      4. utilizing the biomass on the biofilm carriers in the sidestream biofilm reactor to simultaneously nitrify and denitrify ammonium;
   C. after the biomass has been subjected to the reject water and the relatively high ammonium concentration therein, contacting the secondary effluent in the mainstream with the biomass and utilizing the biomass to reduce the ammonium concentration in the secondary effluent;
   D. after contacting the secondary effluent in the mainstream with the biomass and removing ammonium from the secondary effluent, rejuvenating the biomass by contacting the biomass with the reject water having the relatively high ammonium concentration and relatively high temperature in the sidestream; and
   E. continuing to alternate contact of the biomass with the secondary effluent and the reject water to:
      1. remove ammonium from the secondary effluent in the mainstream; and
      2. remove ammonium from the reject water and rejuvenate the biomass in the reject water in the sidestream.

2. The method of claim 1 including transferring the biofilm carriers and the biomass thereon back and forth between the sidestream and the mainstream, wherein the biomass is effective to remove ammonium from the wastewater in the mainstream and wherein the biomass is rejuvenated in the sidestream and further removes ammonium from the reject water in the sidestream.

3. The method of claim 2 wherein the wastewater treatment system includes a deammonification reactor in the mainstream and wherein the method includes transferring the biofilm carriers having the biomass supported thereon back and forth between the deammonification biofilm reactor in the sidestream and the deammonification reactor in the mainstream.

4. The method of claim 1 wherein there is provided a plurality of deammonification biofilm reactors with each deammonification biofilm reactor having biofilm carriers therein having the biomass supported thereon and wherein the plurality of deammonification biofilm reactors function to remove ammonium from the reject water and function to remove ammonium from the secondary effluent.

5. The method of claim 4 wherein during one time period the reject water is directed into one or more of the deammonification biofilm reactors while the secondary effluent is directed into one or more of the other deammonification biofilm reactors.

6. The method of claim 5 wherein during another time period, treatment in the deammonification biofilm reactors is reversed and the secondary effluent is directed into the one or more deammonification biofilm reactors while the reject water is directed into one or more of the other deammonification biofilm reactors.

7. The method of claim 1 wherein there is provided a series of deammonification biofilm reactors for removing ammonium from the reject water and the secondary effluent, and the method includes:
   A. during a first time period removing ammonium from the reject water in a first deammonification biofilm reactor and treating the secondary effluent in a second deammonification biofilm reactor; and
   B. during a second period of time removing ammonium from the secondary effluent in the first deammonification biofilm reactor and removing ammonium from the reject water in the second deammonification biofilm reactor.

8. The method of claim 7 wherein there are at least three deammonification biofilm reactors and wherein at least two of the deammonification biofilm reactors simultaneously remove ammonium from the secondary effluent while at least one of the deammonification biofilm reactors remove ammonium from the reject water and rejuvenate the biomass on the carriers.

9. The method of claim 8 wherein the deammonification biofilm reactors function as a part of the sidestream when removing ammonium from the reject water and function as a part of the mainstream when removing ammonium from the secondary effluent.

10. The method of claim 1 including subjecting the sludge to thermal hydrolysis in the sidestream prior to the sludge being treated in the anaerobic digester.

11. The method of claim 1 wherein the biomass includes aerobic ammonium oxidizing bacteria (AOB) and anaerobic ammonium oxidizing (ANAMMOX) bacteria.

12. The method of claim 11 including providing conditions in the sidestream that are favorable for the growth of ANAMMOX bacteria.

13. The method of claim 12 wherein the conditions that favor the growth of ANAMMOX bacteria include providing the reject water with a relatively high concentration of ammonium, relatively high temperature and a relatively low carbon to nitrogen ratio.

14. The method of claim 1 wherein the deammonification biofilm reactor in the sidestream produces treated reject water and wherein the method includes recycling the treated reject water to the mainstream and mixing the treated reject water with the wastewater in the mainstream.

15. The method of claim 14 wherein the treated reject water is mixed with the wastewater in the mainstream at a point upstream from where the secondary effluent is contacted with the biomass that reduces the ammonium concentration in the secondary effluent.

16. A method of biologically treating wastewater in a wastewater treatment system to remove carbon and ammonium from the wastewater, the method comprising:
   A. treating the wastewater in a mainstream including:
      1. separating primary sludge from the wastewater and producing a primary effluent having a relatively low ammonium concentration;
      2. directing the primary effluent to at least one mainstream reactor;
      3. biologically treating the wastewater in the mainstream reactor to remove carbon from the wastewater and producing a secondary effluent and secondary sludge;
   B treating the primary and secondary sludge in a sidestream including:
      1. directing the sludge to a sidestream anaerobic digester and treating the sludge in the anaerobic digester to produce digested sludge;
      2. directing the digested sludge to a sidestream dewatering system and dewatering the digested sludge to produce reject water having a relatively high ammonium concentration;
      3. directing the reject water to a sidestream deammonification biofilm reactor having biofilm carriers therein;
      4. growing AOB and ANAMMOX bacteria on the biofilm carriers in the sidestream deammonification biofilm reactor;
      5. the AOB and ANAMMOX bacteria effective to remove ammonium from the reject water in the biofilm reactor;
   C. after the AOB and ANAMMOX bacteria have been subjected to the reject water in the sidestream, contacting the wastewater in the mainstream with the AOB and ANAMMOX bacteria and removing ammonium from the wastewater in the mainstream;
   D. after contacting the wastewater in the mainstream with the AOB and ANAMMOX bacteria and removing at least some ammonium from the wastewater in the mainstream, rejuvenating the AOB and ANAMMOX bacteria by contacting the AOB and ANAMMOX bacteria with the reject water in the sidestream deammonification biofilm reactor; and
   E. continuing to alternate contact of the AOB and ANAMMOX bacteria with the wastewater in the mainstream and the reject water in the sidestream to:
      1. remove ammonium from the wastewater in the mainstream; and
      2. rejuvenate the AOB and ANAMMOX bacteria in the sidestream deammonification biofilm reactor.

17. The method of claim 16 wherein the ammonium concentration of the reject water produced in dewatering is at least 300 mg/L.

18. The method of claim 16 wherein the ammonium concentration of the reject water produced in dewatering is approximately 300 mg/L to 2,000 mg/L.

19. The method of claim 16 wherein the deammonification biofilm reactor produces treated reject water and the treated reject water is recycled to the mainstream and mixed with the wastewater in the mainstream upstream of the point where the AOB and ANAMMOX bacteria contact the wastewater.

20. The method of claim 16 wherein the AOB and ANAMMOX bacteria contact the wastewater in the mainstream in a deammonification zone that produces a deammonification effluent, and wherein the method further includes treating the deammonification effluent with a sequenced nitrification and denitrification polishing process.

21. The method of claim 1 wherein the step of biologically treating the wastewater in the mainstream reactor includes subjecting the wastewater in the mainstream to a BOD only removal process.

22. The method of claim 16 including maintaining conditions in the sidestream that are favorable for the growth of AOB and ANAMMOX bacteria including maintaining a relatively high concentration of ammonium in the reject water, maintaining a relatively high temperature in the reject water, and maintaining a relatively low carbon to nitrogen ratio in the reject water.

23. A mainstream and sidestream process for treating wastewater and removing carbon and ammonium from the wastewater, the process comprising:
   A. removing sludge from the wastewater;
   B. biologically treating the wastewater in a mainstream to reduce carbon from the wastewater;
   C. directing the sludge to a sidestream;
   D. in the sidestream:
      (1) directing the sludge to an anaerobic digester and treating the sludge in the anaerobic digester to produce digested sludge;
      (2) dewatering the digested sludge to produce reject water having a relatively high ammonium concentration;
      (3) directing the reject water to a sidestream biofilm reactor having biofilm carriers thereon;
      (4) growing ANAMMOX bacteria on the biofilm carriers in the biofilm reactor in the sidestream;
      (5) utilizing the ANAMMOX bacteria on the biofilm carriers to assist in reducing the ammonium concentration in the reject water;
   E. utilizing the ANAMMOX bacteria on the biofilm carriers to assist in reducing the ammonium concentration of the wastewater in the mainstream which, compared to the reject water, includes a relatively low ammonium concentration, by:
      (1) contacting the wastewater in the mainstream with the ANAMMOX bacteria on the biofilm carriers after the ANAMMOX bacteria has resided in the sidestream biofilm reactor; and
      (2) alternating contact of the ANAMMOX bacteria on the biofilm carriers with the wastewater in the mainstream and with the reject water in the sidestream such that in one mode the ANAMMOX bacteria when contacting the wastewater in the mainstream assists in reducing the ammonium concentration in the wastewater in the mainstream and when in contact with the reject water in the sidestream, the ANAMMOX bacteria assists in reducing the concentration of ammonium in the reject water and wherein exposure of the biomass to the reject water having a relatively high ammonium concentration is effective to rejuvenate the ANAMMOX bacteria such that when the ANAMMOX bacteria contacts the wastewater in the mainstream the ANAMMOX bacteria will be effective to reduce the ammonium concentration of the wastewater in the mainstream.

24. The process of claim 23 including physically transferring the biofilm carriers with the ANAMMOX bacteria thereon back and forth between the sidestream biofilm reactor and a mainstream deammonification reactor.

25. The process of claim 23 including a plurality of biofilm reactors with each biofilm reactor including biofilm carriers having ANAMMOX bacteria supported thereon; wherein in a first mode, the process includes feeding the reject water to a first biofilm reactor while feeding the wastewater in the mainstream to a second biofilm reactor; wherein in a second mode the process includes feeding the reject water to the second biofilm reactor while feeding the wastewater in the mainstream to the first biofilm reactor; and wherein by alternating the feed of the reject water to the first and second biofilm reactors, the reject water is used to rejuvenate the ANAMMOX bacteria in a respective biofilm reactor after which the rejuvenated ANAMMOX bacteria can be utilized to assist in reducing the ammonium concentration of the wastewater in the mainstream.

26. The process of claim 23 wherein the sidestream biofilm reactor forms a part of an integrated fixed film activated sludge system, and wherein the biofilm reactor includes both suspended biomass and fixed film biomass including the ANAMMOX bacteria supported on the carriers in the biofilm reactor.

27. The process of claim 26 wherein there is provided a plurality of IFAS reactors and wherein the IFAS reactors include two or more IFAS reactors that are utilized to reduce the concentration of ammonium in the reject water and in the wastewater in the mainstream.

28. An IFAS wastewater treatment process for reducing the concentration of ammonium in wastewater by utilizing suspended AOB and ANAMMOX bacteria supported on biofilm carriers, the process comprising:
A directing wastewater into a mainstream and removing sludge from the wastewater;
B. biologically treating the wastewater in the mainstream to remove carbon;
C. directing the sludge to a sidestream and in the sidestream anaerobically digesting the sludge to produce digested sludge;
D. separating reject water from the digested sludge and wherein the reject water, compared to the wastewater in the mainstream, includes a relatively high concentration of ammonium;
E. utilizing at least first and second IFAS reactors to treat both the reject water and the wastewater of the mainstream where each IFAS reactor includes both suspended AOB and the ANAMMOX bacteria supported on biofilm carriers;
F. in a first mode, directing the reject water into the first IFAS reactor where the suspended AOB contacts the reject water and performs nitritation and the ANAMMOX bacteria contacts the reject water and performs anaerobic ammonium oxidation process, wherein the combination of the suspended AOB and the ANAMMOX bacteria substantially reduces the ammonium concentration in the reject water;
G. in the first mode, directing the wastewater in the mainstream into the second IFAS reactor where the suspended AOB contacts the wastewater and performs nitritation and the ANAMMOX bacteria contacts the wastewater and performs anaerobic ammonium oxidation process, and wherein the combination of the suspended AOB and the ANAMMOX bacteria substantially reduces the ammonium concentration in the wastewater in the mainstream;
H. in a second mode, reversing the feeds to the first and second IFAS reactors such that the reject water is directed into the second IFAS reactor and the wastewater in the mainstream is directed into the first IFAS reactor where the suspended AOB and ANAMMOX bacteria performs nitritation and ANAMMOX to reduce the ammonium concentration of the reject water and the wastewater contained in the first and second IFAS reactors; and
I. wherein in both the first and second modes, the reject water with the relatively high ammonium concentration functions to rejuvenate the ANAMMOX bacteria supported on the biofilm carriers such that the ANAMMOX bacteria and the suspended AOB will be effective to remove ammonium from the wastewater in the mainstream during a succeeding cycle of operation.

29. An integrated fixed film activated sludge process for removing ammonium from wastewater in a mainstream where the integrated fixed film activated sludge process includes an integrated fixed film activated sludge reactor that includes both suspended biomass and ANAMMOX bacteria supported on biofilm carriers, the process comprising:
A. removing sludge from the wastewater;
B. digesting the sludge to produce reject water in a sidestream where the reject water includes a relatively high ammonium concentration relative to the ammonium concentration of the wastewater in the mainstream;
C. contacting the reject water with the ANAMMOX bacteria in the IFAS reactor where the ANAMMOX bacteria along with the suspended biomass reduces the ammonium concentration of the reject water in the IFAS reactor;
D. after contacting the reject water with the ANAMMOX bacteria in the IFAS reactor, contacting the wastewater in the mainstream with the ANAMMOX bacteria in the IFAS reactor where the ANAMMOX bacteria along with the suspended biomass reduces the ammonium concentration of the wastewater in the mainstream;
E. after contacting the wastewater in the mainstream with the ANAMMOX bacteria, contacting the ANAMMOX bacteria with the reject water in the sidestream where the reject water in the sidestream rejuvenates the ANAMMOX bacteria in the IFAS reactor; and
F. continuing to alternate the contact of the ANAMMOX bacteria in the IFAS reactor with the reject water in the sidesteam and the wastewater in the mainstream such that the ANAMMOX bacteria along with the suspended biomass reduces the concentration of ammonium in the reject water and the wastewater in the mainstream and when the ANAMMOX bacteria is contacted by the reject water, the reject water rejuvenates the ANAMMOX bacteria and causes the ANAMMOX bacteria to grow such that the ANAMMOX bacteria can be effective in reducing the ammonium concentration of the wastewater in the mainstream when the wastewater in the mainstream is next contacted with the ANAMMOX bacteria.

30. A process for treating wastewater, comprising:
removing sludge from the wastewater;
biologically treating the wastewater in a mainstream process to remove carbon with or without biological nutrient (Nitrogen and Phosphorus) removals from the wastewater and producing a mainstream effluent;
directing the sludge to an anaerobic digester in a sidestream and anaerobically digesting the sludge to produce digested sludge;
separating reject water from the digested sludge where the reject water includes ammonium;
directing the reject water having ammonium to a sidestream integrated fixed film activated sludge reactor having suspended biomass and biofilm carriers having ANAMMOX bacteria supported thereon;

providing conditions in the sidestream integrated fixed film activated sludge reactor that is conducive to the growth of the ANAMMOX bacteria on the biofilm carriers;

utilizing the suspended biomass and ANAMMOX bacteria supported on the biofilm carrier in the integrated fixed film activated sludge reactor to substantially reduce the ammonium concentration of the reject water; and directing the reject water to a solids separator located external to the integrated fixed film activated sludge reactor or internal within the integrated fixed film activated sludge reactor and separating reject water from the suspended biomass.

31. The method of claim 30 wherein the ammonium concentration of the reject water is reduced by AOB suspended biomass performing nitritation and the ANAMMOX bacteria performing an anaerobic ammonium oxidation process and wherein both nitritation and the anaerobic ammonium oxidation process is performed in the integrated fixed film activated sludge reactor.

32. The method of claim 31 wherein at least 35% of the ammonium in the reject water is removed by the AOB suspended biomass and wherein at least 30% of the ammonium in the reject water is removed by the ANAMMOX bacteria. At least 65% of the ammonium in the reject water is removed by the combined processes.

33. A mainstream and sidestream wastewater treatment process for removing ammonium from wastewater wherein the wastewater in the mainstream includes a relatively low ammonium concentration and the wastewater in the sidestream includes a relatively high ammonium concentration, the process comprising:

in the sidestream, directing a portion of the wastewater having the relatively high ammonium concentration to a sidestream biofilm reactor having biofilm carriers contained therein;

growing ANAMMOX bacteria on the biofilm carriers in the sidestream biofilm reactor;

utilizing the ANAMMOX bacteria on the biofilm carriers in the sidestream biofilm reactor to assist in reducing the ammonium concentration of the wastewater in the sidestream;

utilizing the ANAMMOX bacteria on the biofilm carriers to assist in reducing the ammonium concentration of the wastewater in the mainstream by:

contacting the wastewater in the mainstream with the ANAMMOX bacteria on the biofilm carriers after the ANAMMOX bacteria has resided in the sidestream biofilm reactor and contacted the wastewater in the sidestream;

alternating contact of the ANAMMOX bacteria on the biofilm carriers with the wastewater in the mainstream and with the wastewater in the sidestream such that when the ANAMMOX bacteria contacts the wastewater in the mainstream, the ANAMMOX bacteria assists in reducing the ammonium concentration in the wastewater in the mainstream, and when the ANAMMOX bacteria contacts the wastewater in the sidestream, the ANAMMOX bacteria assists in reducing the ammonium concentration in the wastewater in the sidestream; and wherein exposure of the ANAMMOX bacteria to the wastewater in the sidestream having the relatively high ammonium concentration is effective to rejuvenate the ANAMMOX bacteria such that when the ANAMMOX bacteria contacts the wastewater in the mainstream, the ANAMMOX bacteria is effective to reduce the ammonium concentration of the wastewater in the mainstream.

34. The process of claim 33 including physically transferring the biofilm carriers with the ANAMMOX bacteria thereon back and forth between the sidestream biofilm reactor and a mainstream deammonification reactor.

35. The process of claim 33 wherein the sidestream biofilm reactor forms one of a plurality of biofilm reactors with each biofilm reactor including biofilm carriers having ANAMMOX bacteria supported thereon;

wherein in the first mode the process includes feeding the wastewater in the sidestream to a first biofilm reactor while feeding the wastewater in the mainstream to a second biofilm reactor;

wherein in the second mode the process includes feeding the wastewater in the sidestream to the second biofilm reactor while feeding the wastewater in the mainstream to the first biofilm reactor; and wherein by alternating the feed of the wastewater in the sidestream to the first and second biofilm reactors, the wastewater in the sidestream is used to rejuvenate the ANAMMOX bacteria in a respective biofilm reactor after which the rejuvenated ANAMMOX bacteria can be utilized to assist in reducing the ammonium concentration of the wastewater in the mainstream.

36. The process of claim 33 wherein the sidestream biofilm reactor forms a part of an integrated fixed film activated sludge system, wherein the sidestream biofilm reactor includes both suspended biomass and fixed film biomass including the ANAMMOX bacteria supported on the biofilm carriers in the sidestream biofilm reactor.

37. The process of claim 36 wherein there is provided a plurality of integrated fixed film activated sludge reactors and wherein the integrated fixed film activated sludge reactors include two or more integrated fixed film activated sludge reactors that are utilized to reduce the concentration of the ammonium in the wastewater in the mainstream.

* * * * *